United States Patent
Isaji et al.

(10) Patent No.: US 7,433,772 B2
(45) Date of Patent: Oct. 7, 2008

(54) TARGET SPEED CONTROL SYSTEM FOR A VEHICLE

(75) Inventors: Kazuyoshi Isaji, Kariya (JP); Naohiko Tsuru, Handa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/703,812

(22) Filed: Feb. 7, 2007

(65) Prior Publication Data

US 2007/0191997 A1    Aug. 16, 2007

(30) Foreign Application Priority Data

| Feb. 13, 2006 | (JP) | ............................. 2006-035566 |
| May 9, 2006 | (JP) | ............................. 2006-130631 |
| Aug. 24, 2006 | (JP) | ............................. 2006-228374 |

(51) Int. Cl.
*B60T 7/12* (2006.01)
*B60B 39/00* (2006.01)

(52) U.S. Cl. ............................. 701/71; 701/70; 701/93; 701/96; 340/435; 340/436; 340/437

(58) Field of Classification Search ............ 701/70–71, 701/93, 96; 340/435–437
See application file for complete search history.

(56) References Cited

U.S. PATENT DOCUMENTS

| 4,366,546 A | * | 12/1982 | Tachibana et al. ............ 701/74 |
| 4,872,540 A | * | 10/1989 | Sekine et al. ............... 477/169 |
| 5,539,397 A | * | 7/1996 | Asanuma et al. ............ 340/901 |
| 5,572,428 A |  | 11/1996 | Ishida et al. |
| 5,586,028 A | * | 12/1996 | Sekine et al. ................. 701/1 |
| 5,661,650 A |  | 8/1997 | Sekine et al. |
| 5,761,630 A | * | 6/1998 | Sekine et al. ............... 701/301 |
| 5,854,987 A |  | 12/1998 | Sekine et al. |
| 5,878,361 A |  | 3/1999 | Sekine et al. |
| 5,878,362 A |  | 3/1999 | Sekine et al. |
| 5,915,368 A | * | 6/1999 | Ishida et al. ................ 123/675 |
| 5,928,299 A |  | 7/1999 | Sekine et al. |
| 6,003,627 A | * | 12/1999 | Ishida ........................ 180/206 |
| 6,009,964 A | * | 1/2000 | Ishida ........................ 180/6.5 |
| 6,092,017 A | * | 7/2000 | Ishida et al. ................ 701/106 |

(Continued)

FOREIGN PATENT DOCUMENTS

CN           101020453 A   *   2/2007

(Continued)

OTHER PUBLICATIONS

Active Sensing for High-Speed Offroad Driving; Patel, K.; Macklem, W.; Thrun, S.; Montemerlo, M.;Robotics and Automation, 2005. ICRA 2005. Proceedings of the 2005 IEEE International Conference on Apr. 18-22, 2005 pp. 3162-3168.*

(Continued)

*Primary Examiner*—Cuong H. Nguyen
(74) *Attorney, Agent, or Firm*—Harness, Dickey & Pierce, PLC

(57) ABSTRACT

When a vehicle travels along a curve of a road, a target vehicle acceleration/deceleration that is used for accelerating/decelerating the vehicle to a target vehicle speed, which is set for the curve, is calculated. Based on a comparison between a present vehicle speed of the vehicle and the target vehicle speed, the vehicle is controlled such that an acceleration/deceleration of the vehicle coincides with the target vehicle acceleration/deceleration.

44 Claims, 14 Drawing Sheets

U.S. PATENT DOCUMENTS

| | | | | |
|---|---|---|---|---|
| 6,116,214 | A | * | 9/2000 | Ishida .................. 123/399 |
| 6,138,071 | A | * | 10/2000 | Sekine et al. ............. 701/93 |
| 6,141,617 | A | * | 10/2000 | Matsuda et al. .......... 701/72 |
| 6,393,361 | B1 | | 5/2002 | Yano et al. |
| 6,424,904 | B1 | | 7/2002 | Takahashi et al. |
| 6,663,191 | B2 | * | 12/2003 | Sakata et al. ................ 303/3 |
| 6,665,603 | B2 | * | 12/2003 | Jindo et al. ............... 701/96 |
| 7,178,883 | B2 | * | 2/2007 | Sekine .................. 303/140 |
| 2002/0096939 | A1 | * | 7/2002 | Sakata et al. .......... 303/119.1 |
| 2003/0116103 | A1 | * | 6/2003 | Murakami et al. ...... 123/41.1 |
| 2004/0111209 | A1 | | 6/2004 | Kagawa et al. |
| 2005/0280520 | A1 | | 12/2005 | Kubo |
| 2007/0191997 | A1 | * | 8/2007 | Isaji et al. .................. 701/1 |

FOREIGN PATENT DOCUMENTS

| | | |
|---|---|---|
| EP | 0 941 902 | 9/1999 |
| EP | 1818231 A2 * | 8/2007 |
| JP | 10122872 A * | 5/1998 |
| JP | 2001-093096 | 4/2001 |
| JP | 2002-096654 | 4/2002 |
| JP | 2004-230946 | 8/2004 |
| JP | 2005-107916 | 4/2005 |

OTHER PUBLICATIONS

Importance of Hydrodynamic Considerations for Underwater Vehicle Design; Paster, D.; Oceans vol. 18, Sep. 1986 pp. 1413-1422.*

Visual control of an autonomous vehicle (BART)-the vehicle-following problem; Kehtarnavaz, N.; Griswold, N.C.; Lee, J.S.; Vehicular Technology, IEEE Transactions on vol. 40, Issue 3, Aug. 1991 pp. 654-662; Digital Object Identifier 10.1109/25.97520.*

Design and stability analysis of a lane following controller; Unyelioglu, K.A.; Hatipoglu, C.; Ozguner, U.; Control Systems Technology, IEEE Transactions on vol. 5, Issue 1, Jan. 1997 pp. 127-134 Digital Object Identifier 10.1109/87.553671.*

Design and control considerations for automated ground transportation systems; Hajdu, L.P.; Gardiner, K.W.; Tamura, H.; Pressman, G.L.; Proceedings of the IEEE; vol. 56, Issue 4, Apr. 1968 pp. 493-513□□.*

Inter-vehicle mobile ad hoc network for road transport systems; Sharif, B.S.; Blythe, P.T.; Almajnooni, S.M.; Tsimenidis, C.C.; Intelligent Transport Systems, IET vol. 1, Issue 1, Mar. 2007 pp. 47-56; Digital Object Identifier 10.1049/iet-its:20070001.*

Exploring the relationships between crash rates and average speed difference between cars and large vehicles on a suburban freeway; Zhong Liande; Sun Xiaoduan; Chen Yongsheng; Zhang Jie; Intelligent Transportation Systems Conference, 2006. ITSC '06. IEEE 2006 pp. 1638-1641; Digital Object Identifier 10.1109/ITSC.2006.1707459.*

A new threat assessment measure for collision avoidance systems; Yizhen Zhang; Antonsson; E.K.; Grote, K.; Intelligent Transportation Systems Conference, 2006. ITSC '06. IEEE 2006 pp. 968-975; Digital Object Identifier 10.1109/ITSC.2006.1706870.*

Nonlinear constrained tracking of targets on roads; Yang, C.; Bakich, M.; Blasch, E.; Information Fusion, 2005 8th International Conference on vol. 1, Jul. 25-28, 2005 p. 8 pp.; Digital Object Identifier 10.1109/ICIF.2005.1591860.*

VEHIL: developing and testing intelligent vehicles; Verburg, D.J.; van der Knaap, A.C.M.; Ploeg, J.; Intelligent Vehicle Symposium, 2002. IEEE vol. 2, Jun. 17-21, 2002 pp. 537-544 vol. 2.*

Development of a 60 GHz radar for rear-end collision avoidance; Yamada, Y.; Tokoro, S.; Fujita, Y.; Intelligent Vehicles '94 Symposium, Proceedings of the Oct. 24-26, 1994 pp. 207-212; Digital Object Identifier 10.1109/IVS.1994.639504.*

Experimentation with a vehicle platoon control system; Chang, K.S.; Li, W.; Devlin, P.; Shaikhbahai, A.; Varaiya, P.; Hedrick, J.K.; McMahon, D.; Narendran, V.; Swaroop, D.; Olds, J.; Vehicle Navigation and Information Systems Conference, 1991 vol. 2, Oct. 20-23, 1991 pp. 1117-1124.*

Office Action dated Apr. 25, 2008 in Japanese Application No. 2006-228374 with English translation thereof.

Extended Search Report dated May 8, 2008 in European Application No. 07002197.

* cited by examiner

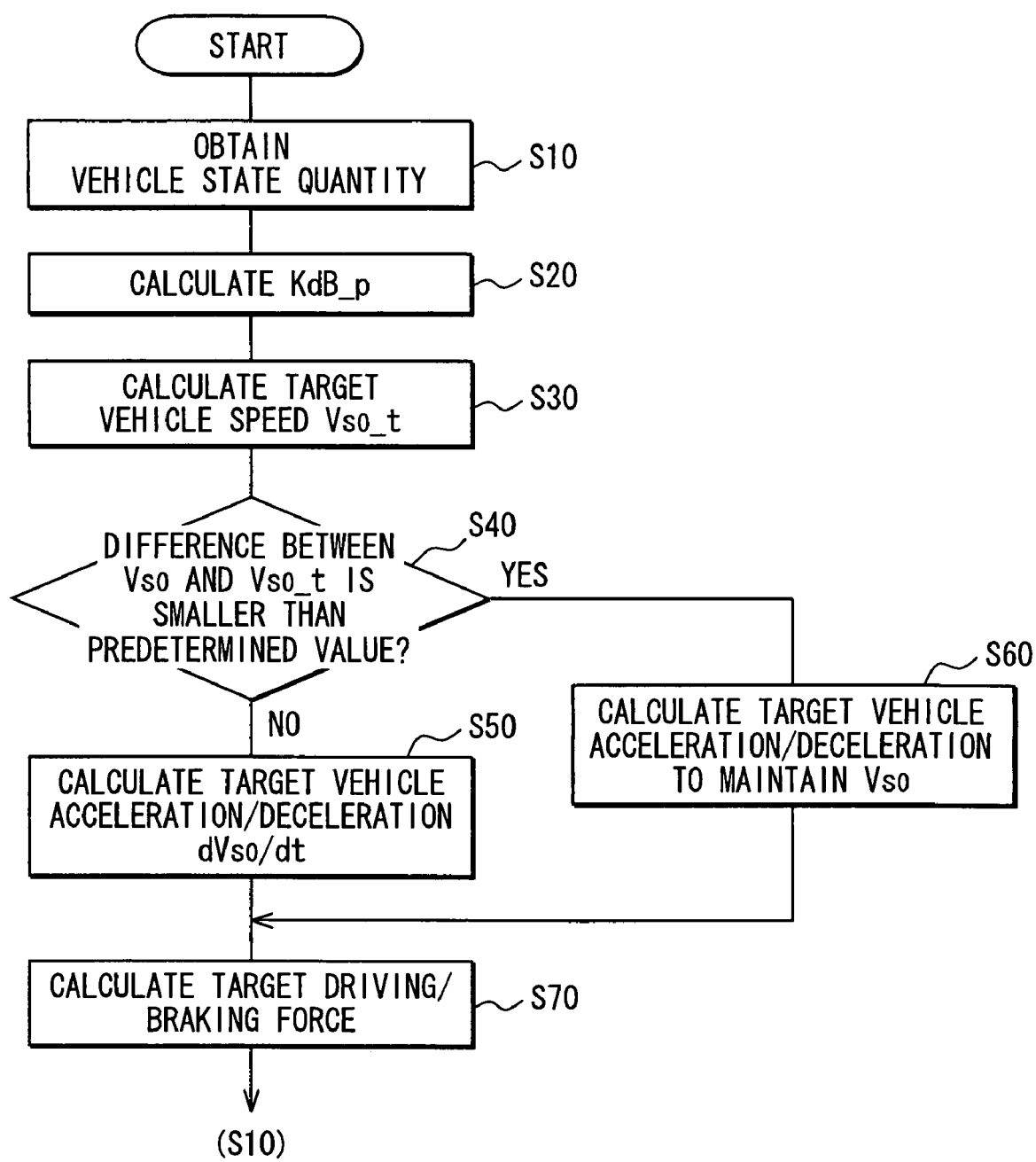

TARGET SPEED CONTROL SYSTEM FOR A VEHICLE

CROSS REFERENCE TO RELATED APPLICATION

This application is based on and incorporates herein by reference Japanese Patent Application No. 2006-35566 filed on Feb. 13, 2006, Japanese Patent Application No. 2006-130631 filed on May 9, 2006, and Japanese Patent Application No. 2006-228374 filed on Aug. 24, 2006.

BACKGROUND OF THE INVENTION

1. Field of the Invention

The present invention relates to a vehicle control system.

2. Description of Related Art

A vehicle control system, which determines a shape of a road that is ahead of a vehicle and controls a speed of the vehicle, is conventionally proposed (e.g., JP3432881B2). According to the vehicle control system in JP3432881 B2, when the vehicle is decelerated with a predetermined deceleration from a vehicle speed $V_0$, a distance (a foreseen distance), which is traveled until the vehicle stops within a predetermined time t2, is determined. A tentative vehicle position is set at a position ahead of the vehicle with the foreseen distance therebetween. A second reference node is set at the tentative vehicle position, and a third reference node is set at a position that is ahead of the second reference node with a distance A (i.e., the vehicle speed $V_0$×a predetermined time t1) therebetween. In addition, a possible traveling vehicle speed, which is used in order that the vehicle travels between the second and third reference node with a reference lateral acceleration or lower, is obtained. When existence of a curve ahead of the vehicle is determined, and the vehicle speed $V_0$ is larger than the possible traveling vehicle speed, the vehicle is automatically decelerated by a vehicle speed control means such that it travels safely along the curve.

However, when the vehicle speed $V_0$ is larger than the possible traveling vehicle speed, the vehicle speed control means in the above vehicle control system does not set a target vehicle speed to automatically decelerate the vehicle such that the vehicle travels with the target vehicle speed. Therefore, there is a possibility that the vehicle is unduly decelerated by the automatic deceleration.

Furthermore, the above vehicle speed control means does not automatically accelerate the vehicle when the vehicle speed $V_0$ is smaller than the possible traveling vehicle speed. Hence, the vehicle speed control means cannot assist a driver of the vehicle with his/her drive operation of the vehicle in a comprehensive manner when the vehicle travels along the curve.

SUMMARY OF THE INVENTION

The present invention addresses the above disadvantages. Thus, it is an objective of the present invention to provide a vehicle control system, which decelerates a vehicle such that the vehicle travels along a curve of a road with a vehicle speed, with which the vehicle can travel safely. It is another objective of the present invention to provide a vehicle control system, which assists a driver of the vehicle with his/her drive operation of the vehicle in a comprehensive manner when the vehicle travels along the curve.

To achieve the objective of the present invention, there is provided a vehicle control system for controlling a vehicle. The vehicle control system includes a distance obtaining means, an evaluation index calculating means, a curvature radius obtaining means, a target vehicle speed setting means, a vehicle speed obtaining means, a target vehicle deceleration calculating means, and a vehicle control means. The distance obtaining means is for obtaining a distance between the vehicle and a road associated object on a road. The road associated object is an object located along an extension line of a traveling direction of the vehicle, and at a boundary of a curve of the road or in a vicinity of the boundary, wherein the curve exists ahead of the vehicle. The evaluation index calculating means is for calculating an approaching/separating state evaluation index that indicates a positional relationship between the vehicle and the road associated object. The approaching/separating state evaluation index increases when a relative speed between the vehicle and the road associated object increases at a time of approaching of the vehicle to the road associated object. The approaching/separating state evaluation index for the relative speed increases at a faster rate as the distance decreases. The curvature radius obtaining means is for obtaining a curvature radius of the curve. The target vehicle speed setting means is for setting a target vehicle speed of the vehicle, with which the vehicle travels along the curve, based on the curvature radius of the curve. The vehicle speed obtaining means is for obtaining a current speed of the vehicle. The target vehicle deceleration calculating means is for calculating a target vehicle deceleration, with which the vehicle is controlled to travel so that the vehicle travels along the curve with the target vehicle speed, based on the approaching/separating state evaluation index, the distance, the current speed of the vehicle, and the target vehicle speed. The vehicle control means is for controlling the vehicle to decelerate such that a deceleration of the vehicle coincides with the target vehicle deceleration, when the speed of the vehicle is larger than the target vehicle speed.

To achieve the objective of the present invention, there is also provided a vehicle control system for controlling a vehicle. The vehicle control system includes a distance obtaining means, an evaluation index calculating means, a curvature radius obtaining means, a target vehicle speed setting means, a vehicle speed obtaining means, a target vehicle acceleration/deceleration calculating means, and a vehicle control means. The distance obtaining means is for obtaining a distance between the vehicle and a road associated object on a road. The road associated object is an object located along an extension line of a traveling direction of the vehicle, and at a boundary of a curve of the road or in a vicinity of the boundary, wherein the curve exists ahead of the vehicle. The evaluation index calculating means is for calculating an approaching/separating state evaluation index that indicates a positional relationship between the vehicle and the road associated object. The approaching/separating state evaluation index increases when a relative speed between the vehicle and the road associated object increases at a time of approaching of the vehicle to the road associated object. The approaching/separating state evaluation index for the relative speed increases at a faster rate as the distance decreases. The curvature radius obtaining means is for obtaining a curvature radius of the curve. The target vehicle speed setting means is for setting a target vehicle speed of the vehicle, with which the vehicle travels along the curve, based on the curvature radius of the curve. The vehicle speed obtaining means is for obtaining a current speed of the vehicle. The target vehicle acceleration/deceleration calculating means is for calculating a target vehicle acceleration or deceleration, with which the vehicle is controlled to travel so that the vehicle travels along the curve with the target vehicle speed, based on the approaching/separating state evaluation index, the distance, the current speed of the vehicle, and the target vehicle speed. The vehicle control means is for controlling the vehicle such that an acceleration or deceleration of the vehicle coincides with the target vehicle acceleration or deceleration, respectively, based on a comparison between the current speed of the vehicle and the target vehicle speed.

As well, to achieve the objective of the present invention, there is provided a vehicle control system for controlling a vehicle. The vehicle control system includes a distance obtaining means, a relative speed obtaining means, an evaluation index calculating means, a turning radius calculating means, a target lateral acceleration setting means, a target relative speed calculating means, a target relative deceleration calculating means, and a vehicle control means. The distance obtaining means is for obtaining a distance between the vehicle and an obstruction on a road. The obstruction exists on the road, which is ahead of the vehicle in a traveling direction of the vehicle. The relative speed obtaining means is for obtaining a relative speed between the vehicle and the obstruction. The evaluation index calculating means is for calculating an approaching/separating state evaluation index that indicates a positional relationship between the vehicle and the obstruction. The approaching/separating state evaluation index increases when the relative speed increases at a time of approaching of the vehicle to the obstruction. The approaching/separating state evaluation index for the relative speed increases at a faster rate as the distance decreases. The turning radius calculating means is for calculating a turning radius of the vehicle, which is necessary for the vehicle to avoid a collision with the obstruction, based on the distance. The target lateral acceleration setting means is for setting a target value of a lateral acceleration, which is generated in the vehicle in a lateral direction of the vehicle through a steering operation by a driver of the vehicle to avoid the collision. The target relative speed calculating means is for calculating a target relative speed between the vehicle and the obstruction based on the turning radius and the target value of the lateral acceleration. The target relative deceleration calculating means is for calculating a target relative deceleration between the vehicle and the obstruction based on the distance, the relative speed, and the approaching/separating state evaluation index. The vehicle control means is for controlling the vehicle to decelerate such that a relative deceleration between the vehicle and the obstruction coincides with the target relative deceleration when the relative speed is larger than the target relative speed. The vehicle is controlled to travel with the target relative deceleration by the vehicle control means so that the vehicle is decelerated to the target relative speed.

Moreover, to achieve the objective of the present invention, there is also provided a vehicle control system for controlling a vehicle. The vehicle control system includes a distance obtaining means, an evaluation index calculating means, a curvature radius obtaining means, a target vehicle speed setting means, a vehicle speed obtaining means, a relative speed obtaining means, a turning radius calculating means, a target lateral acceleration setting means, a target relative speed calculating means, a target vehicle acceleration/deceleration calculating means, a target relative deceleration calculating means, and a vehicle control means. The distance obtaining means is for obtaining a distance between the vehicle and one of an obstruction and a road associated object. The vehicle travels along a road, and the obstruction exists on a curve of the road, wherein the curve exists ahead of the vehicle in a traveling direction of the vehicle. The road associated object is an object located at a boundary of the curve or in a vicinity of the boundary. The evaluation index calculating means is for calculating an approaching/separating state evaluation index that indicates a positional relationship between the vehicle and the one of the obstruction and the road associated object. The approaching/separating state evaluation index increases when a relative speed between the vehicle and the one of the obstruction and the road associated object increases at a time of approaching of the vehicle to the one of the obstruction and the road associated object. The approaching/separating state evaluation index for the relative speed increases at a faster rate as the distance decreases. The curvature radius obtaining means is for obtaining a curvature radius of the curve. The target vehicle speed setting means is for setting a target vehicle speed of the vehicle, with which the vehicle travels along the curve, based on the curvature radius of the curve. The vehicle speed obtaining means is for obtaining a current speed of the vehicle. The relative speed obtaining means is for obtaining the relative speed between the vehicle and the obstruction. The turning radius calculating means is for calculating a turning radius of the vehicle, which is necessary for the vehicle to avoid a collision with the obstruction, based on the distance between the vehicle and the obstruction. The target lateral acceleration setting means is for setting a target value of a lateral acceleration, which is generated in the vehicle in a lateral direction of the vehicle through a steering operation by a driver of the vehicle to avoid the collision. The target relative speed calculating means is for calculating a target relative speed between the vehicle and the obstruction based on the turning radius and the target value of the lateral acceleration. The target vehicle acceleration/deceleration calculating means is for calculating a target vehicle acceleration or deceleration, with which the vehicle is controlled to travel so that the vehicle travels along the curve with the target vehicle speed, based on the approaching/separating state evaluation index between the vehicle and the road associated object, the distance between the vehicle and the road associated object, the current speed of the vehicle, and the target vehicle speed. The target relative deceleration calculating means is for calculating a target relative deceleration between the vehicle and the obstruction based on the distance between the vehicle and the obstruction, the relative speed, and the approaching/separating state evaluation index between the vehicle and the obstruction. The vehicle control means is for controlling the vehicle to decelerate such that a relative deceleration between the vehicle and the obstruction coincides with the target relative deceleration when the obstruction exists on the curve and the relative speed is larger than the target relative speed, wherein the vehicle is controlled to travel with the target relative deceleration by the vehicle control means so that the vehicle is decelerated to the target relative speed. As well, the vehicle control means is for controlling the vehicle such that an acceleration or deceleration of the vehicle coincides with the target vehicle acceleration or deceleration, respectively, based on a comparison between the current speed of the vehicle and the target vehicle speed when the obstruction does not exist on the curve.

Furthermore, to achieve the objective of the present invention, there is also provided a vehicle control system for controlling a vehicle. The vehicle control system includes a distance obtaining means, a relative speed detecting means, an evaluation index calculating means, a deceleration target calculating means, a deceleration target determining means, a target value setting means, a target vehicle deceleration calculating means, and a braking force control means. The distance obtaining means is for obtaining a distance between the vehicle and a road associated object on a road. The road associated object is an object located along an extension line of a traveling direction of the vehicle, and at a boundary of a curve of the road or in a vicinity of the boundary, wherein the curve exists ahead of the vehicle. The relative speed detecting means is for detecting a relative speed between the vehicle and the road associated object. The evaluation index calculating means is for calculating an approaching/separating state evaluation index that indicates a positional relationship between the vehicle and the road associated object. The approaching/separating state evaluation index increases when the relative speed increases, at a time of approaching of the vehicle to the road associated object. The approaching/separating state evaluation index for the relative speed increases at a faster rate as the distance decreases. The deceleration target calculating means is for calculating a deceleration target based on a normal deceleration of the vehicle, the distance, and the relative speed. The deceleration target indicates an index of a timing, with which braking force applied through a brake system of the vehicle when the vehicle proceeds into the curve or travels along the curve is controlled. The deceleration target determining means is for determining whether the approaching/separating state evaluation index is larger than the deceleration target. The target value setting means is for setting a target value of the approaching/separating state evaluation index, such that the target value of the approaching/separating state evaluation index increases linearly from an initial value at a constant slope when the distance decreases. The initial value is the approaching/separating state evaluation index at a time when the deceleration target determining means determines that the approaching/separating state evaluation index is larger than the deceleration target. The constant slope is a slope of the approaching/separating state evaluation index at the time when the deceleration target determining means determines that the approaching/separating state evaluation index is larger than the deceleration target. The target vehicle deceleration calculating means is for calculating a target vehicle deceleration based on a target relative speed between the vehicle and the road associated object, and a present relative speed between the vehicle and the road associated object, wherein the target relative speed is obtained based on the target value of the approaching/separating state evaluation index. The braking force control means is for controlling the braking force applied through the brake system such that a deceleration of the vehicle coincides with the target vehicle deceleration when the vehicle proceeds into the curve or travels along the curve.

Lastly, to achieve the objective of the present invention, there is provided a vehicle control system for controlling a vehicle. The vehicle control system includes a distance obtaining means, a relative speed detecting means, an evaluation index calculating means, a target value setting means, a target vehicle deceleration calculating means, and a braking force control means. The distance obtaining means is for obtaining a distance between the vehicle and a road associated object on a road. The road associated object is an object located along an extension line of a traveling direction of the vehicle, and at a boundary of a curve of the road or in a vicinity of the boundary, wherein the curve exists ahead of the vehicle. The relative speed detecting means is for detecting a relative speed between the vehicle and the road associated object. The evaluation index calculating means is for calculating an approaching/separating state evaluation index that indicates a positional relationship between the vehicle and the road associated object. The approaching/separating state evaluation index increases when the relative speed increases at a time of approaching of the vehicle to the road associated object. The approaching/separating state evaluation index for the relative speed increases at a faster rate as the distance decreases. The target value setting means is for setting a target value of the approaching/separating state evaluation index, such that the target value of the approaching/separating state evaluation index increases linearly from an initial value at a constant slope when the distance decreases. The initial value is the approaching/separating state evaluation index at a time when a driver of the vehicle starts a drive operation to decelerate the vehicle when the vehicle proceeds into the curve or travels along the curve. The constant slope is a slope of the approaching/separating state evaluation index at the time when the driver starts the drive operation to decelerate the vehicle. The target vehicle deceleration calculating means is for calculating a target vehicle deceleration based on a target relative speed between the vehicle and the road associated object and a present relative speed between the vehicle and the road associated object, wherein the target relative speed is obtained based on the target value of the approaching/separating state evaluation index. The braking force control means is for controlling braking force, which is applied through a brake system of the vehicle, such that a deceleration of the vehicle coincides with the target vehicle deceleration, when the vehicle proceeds into the curve or travels along the curve.

BRIEF DESCRIPTION OF THE DRAWINGS

The invention, together with additional objectives, features and advantages thereof, will be best understood from the following description, the appended claims and the accompanying drawings in which:

FIG. 6 is a flowchart showing control processing performed in a curve travel ECU according to the first embodiment;

DETAILED DESCRIPTION OF THE INVENTION

Embodiments of the present invention will be described below with reference to the accompanying drawings. The embodiments will be described with respect to an application of a vehicle control system of the present invention to a vehicle drive assist system.

First Embodiment

Figure 1:
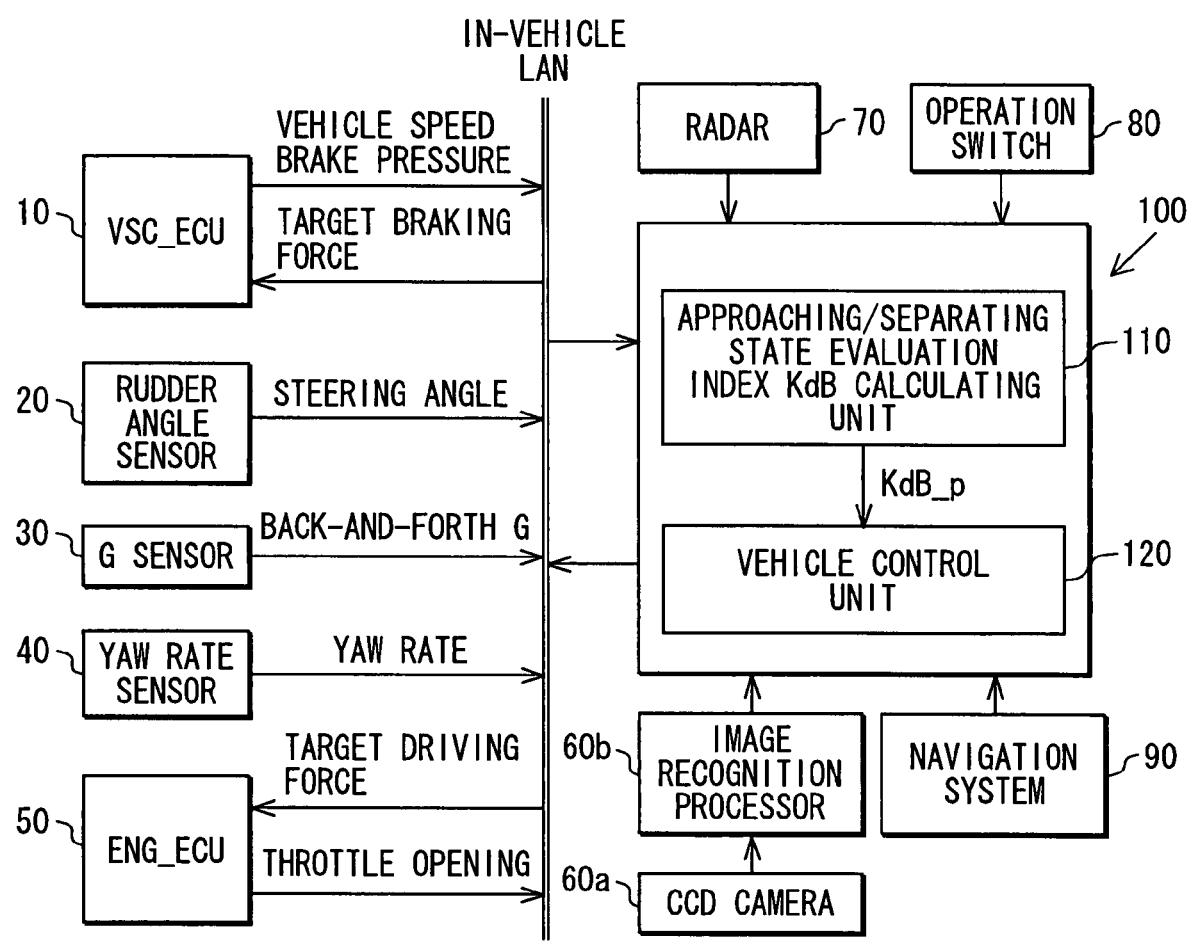
FIG. 1 is a block diagram showing an overall configuration of a vehicle drive assist system according to a first embodiment of the present invention.

FIG. 1 shows an overall configuration of a vehicle drive assist system according to a first embodiment. As shown in FIG. 1, the vehicle drive assist system includes a VSC_ECU 10, a rudder angle sensor 20, a G sensor 30, a yaw rate sensor 40, an ENG_ECU 50, a CCD camera 60a, an image recognition processor 60b, a radar 70, an operation switch 80, a navigation system 90, and a curve travel ECU 100.

The VSC_ECU 10 controls a brake actuator (not shown) that applies braking force to a vehicle, and has a function of controlling a Vehicle Stability Control (VSC; a registered trademark) that controls skidding of the vehicle. The VSC_ECU 10 receives information about target braking force from an in-vehicle LAN, and controls the brake actuator to generate the target braking force. Moreover, the VSC_ECU 10 transmits information about a speed (a vehicle speed) $V_{s0}$ of the vehicle and a brake pressure to the in-vehicle LAN. The rudder angle sensor 20 detects information about a steering angle of the vehicle, and transmits the detected information to the in-vehicle LAN.

The G sensor 30 is an acceleration sensor that detects an acceleration (back-and-forth acceleration) that is generated in a back-and-forth direction of the vehicle, and transmits information about the detected back-and-forth acceleration to the in-vehicle LAN. The yaw rate sensor 40 detects an angular speed (a yaw rate) around a vertical axis of the vehicle, and transmits information about the detected yaw rate to the in-vehicle LAN.

Figure 5A:
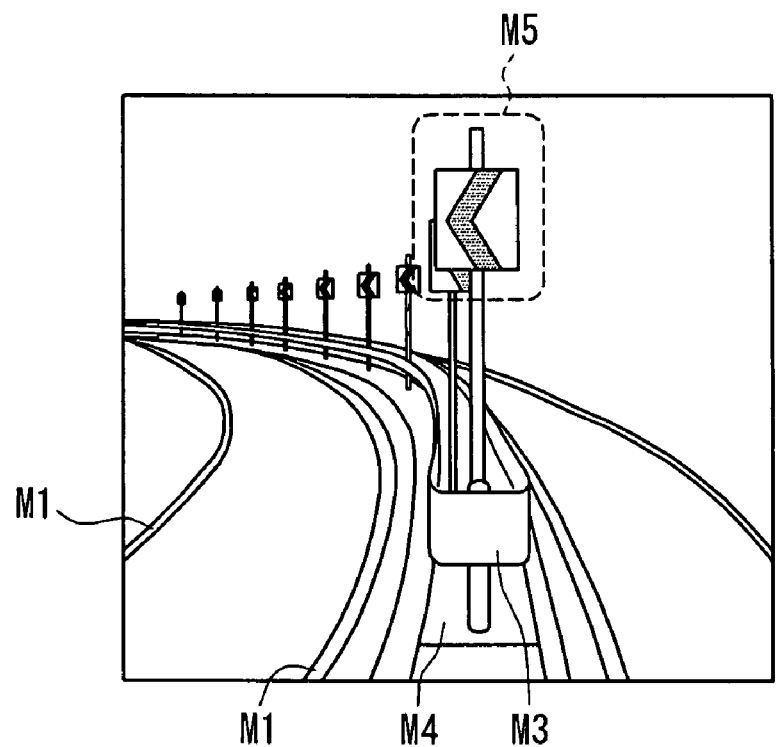
FIG. 5A is a schematic view showing examples of a lane marking, a reflective plate, a guardrail, and a curbstone according to the first embodiment.
Figure 5B:
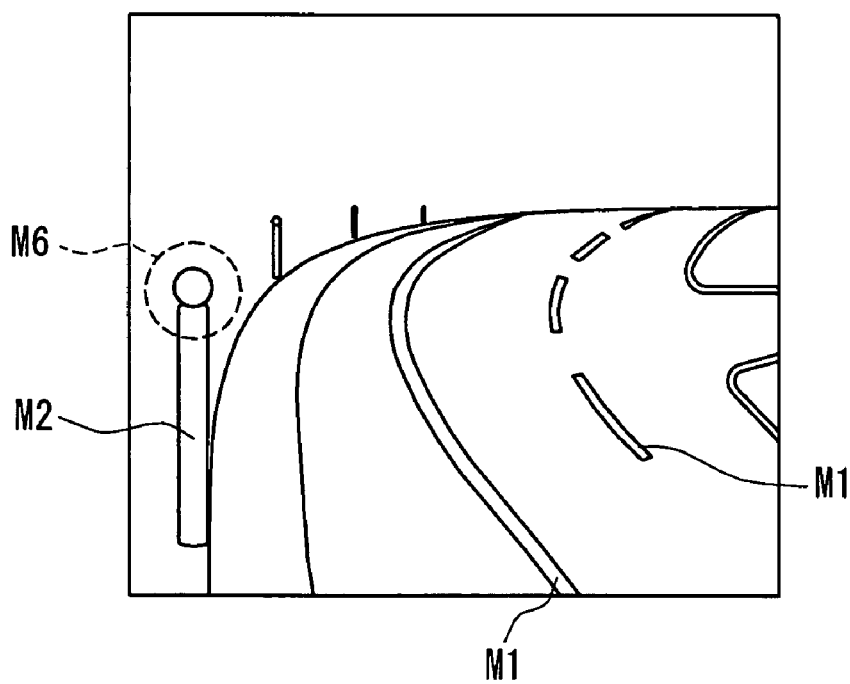
FIG. 5B is a schematic view showing examples of a pole and a delineator according to the first embodiment.

The ENG_ECU 50 receives information about target driving force from the in-vehicle LAN, and controls a throttle actuator (not shown) to generate the target driving force. The CCD camera 60a is an image taking means for taking an image, which captures a predetermined range ahead of the vehicle, and outputs the image to the recognition processor 60b. The recognition processor 60b performs predetermined image recognition processing on the inputted image to recognize road associated objects, such as a lane marking M1, a pole M2, a guardrail M3, and a curbstone M4, for example. The road associated objects may be located at a boundary of a curve of the road ahead of the vehicle, or in its vicinity (FIGS. 5A, 5B). Then, the recognition processor 60b obtains a relative position of the vehicle to the road associated object, and outputs information about a type of the road associated object and the relative position to the curve travel ECU 100.

The radar 70, for example, applies a laser light to a predetermined range ahead of the vehicle and receives a reflected light to detect distances to the road associated objects such as a reflective plate M5 and a delineator M6, deviation amounts (lateral deviation amounts) of central axes of the road associated objects from a widthwise central axis of the vehicle, and the like. The reflective plate M5 indicates reflected light intensity that is equal to or higher than predetermined intensity, and the road associated objects may be located at the boundary of the curve of the road or in its vicinity as shown in FIGS. 5A, 5B. Then, the radar 70 outputs information about the distances to the road associated objects, the lateral deviation amounts and the like to the curve travel ECU 100.

The operation switch 80 is a group of switches that a driver of the vehicle operates. Operational information that is inputted through the group of switches is outputted to the curve travel ECU 100. The navigation system 90 includes a geomagnetic sensor, a gyroscope, a distance sensor, a position detector, a road map data storage, a color display, and a control circuit, which are all known. The position detector includes a GPS (global positioning system) receiver for a GPS that detects a position of the vehicle based on radio waves from GPS satellites, and the like. The road map data storage stores road map data. Liquid crystal or a CRT, for example, is employed in the color display.

The road map data includes link data and node data for expressing roads on a map using links and nodes, respectively. The link data and node data include information about coordinates of starting points and endpoints of the links, link length, passing division width, and curvature radiuses of the roads. The navigation system 90 identifies a present position of the vehicle in response to a command from the curve travel ECU 100, and outputs the link data and node data on the curve, which exists within the predetermined range ahead of the vehicle.

The curve travel ECU 100 includes an approaching/separating state evaluation index calculating unit 110 and a vehicle control unit 120. The curve travel ECU 100 functions mainly as a microcomputer, and includes a known CPU, ROM, RAM, and I/O, and a bus that connects them.

When the curve exists ahead of the vehicle in its traveling direction, the curve travel ECU 100 sets a target vehicle speed, with which the vehicle travels along the curve. Then, the curve travel ECU 100 calculates a target vehicle acceleration/deceleration, which is used for accelerating/decelerating the vehicle to the target vehicle speed. Based on a comparison between the target vehicle speed and a vehicle speed of the vehicle, the curve travel ECU 100 controls the vehicle to accelerate/decelerate so that the acceleration/deceleration of the vehicle reaches the target vehicle acceleration/deceleration.

Using the following equation (1), the evaluation index calculating unit 110 calculates a present approaching/separating state evaluation index KdB_p between the vehicle and the road associated object, from a distance D between the vehicle and the road associated object located on the curve that exists ahead of the vehicle (i.e., a distance between the vehicle and a point at which the vehicle deviates from the curve), and the vehicle speed $V_{s0}$ using the following equation (1). In addition, $|-2 \times V_{s0}|$ in the equation (1) expresses an absolute value of $(-2 \times V_{s0})$.

$$KdB\_p = 10 \times \log\{|-2 \times V_{s0}|/(D^3 \times 5 \times 10^{-8})\} \tag{1}$$

As above, the road associated objects such as the lane marking M1, pole M2, guardrail M3, curbstone M4, reflective plate M5, and delineator M6 are located at the boundary of the curve, or in its vicinity. Thus, the distance D is obtained from positions of these road associated objects. Alternatively, the distance D may be obtained using the link data and node data in the road map data, and a detected result in the GPS receiver.

Figure 2:
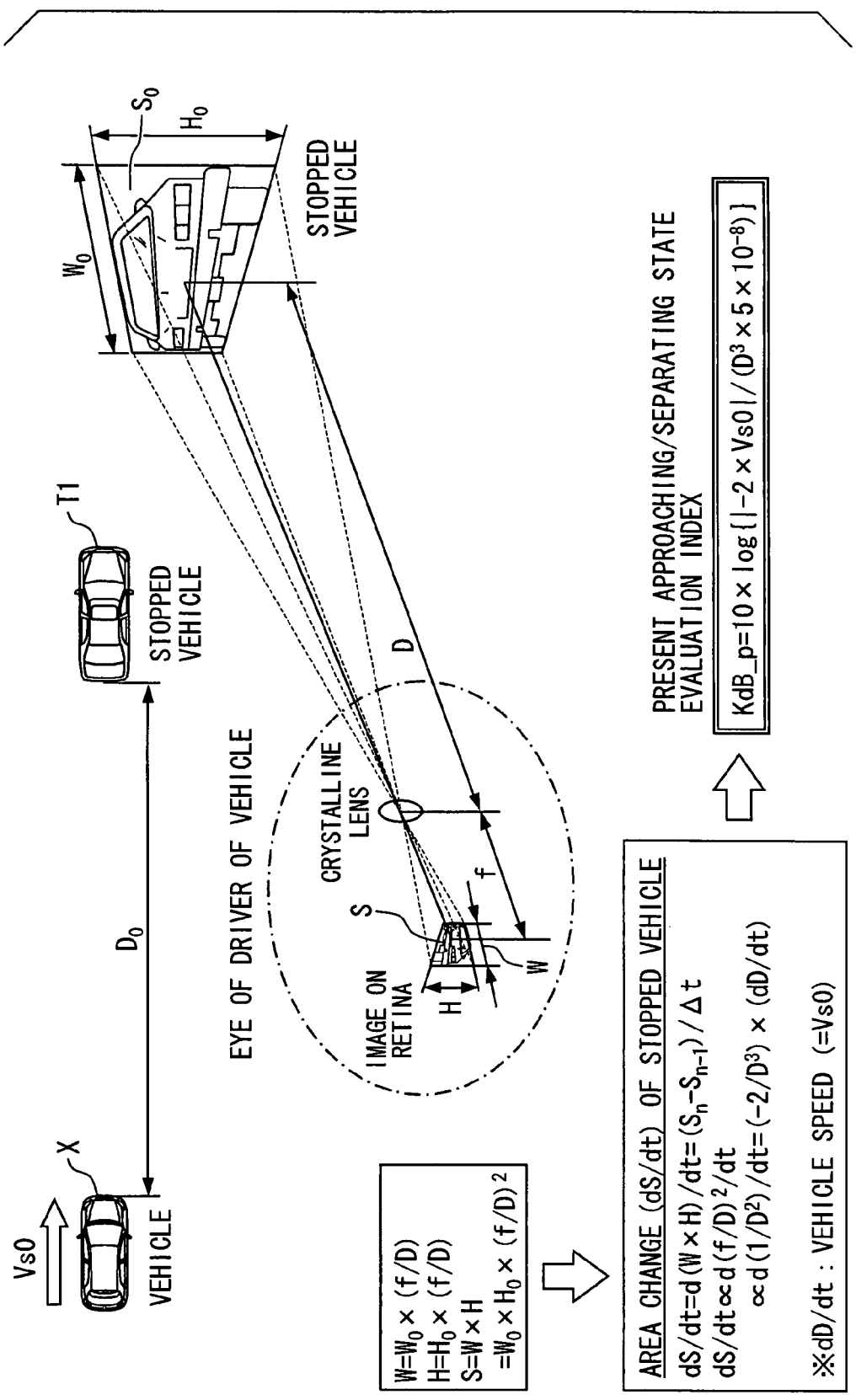
FIG. 2 is an illustrative view illustrating a present approaching/separating state evaluation index between a vehicle and a road associated object.

An explanation as to the above equation (1) will be given below. When a static object (e.g., a stopped vehicle) exists ahead of the vehicle as shown in FIG. 2, an area (S) of an image of the stopped vehicle is expressed in the following equation (2), given actual height ($H_0$) and width ($W_0$) of the stopped vehicle, an area ($S_0(=W_0 \times H_0)$), height (H) and width (W) of the image of the stopped vehicle, which is projected on (a retina of) an eye of the driver of the vehicle, the area ($S(=W \times H)$), a distance (D, which equals a distance $D_0$ between the stopped vehicle and the vehicle for convenience sake) between the stopped vehicle and (a crystalline lens of) the eye of the driver, and a focal length (f) of the eye of the driver.

$$S = W \times H = W_0 \times H_0 \times (f/D)^2 \qquad (2)$$

A degree of variation in the area S of the image of the stopped vehicle per unit time dS/dt (i.e., area change of the image of the stopped vehicle) is expressed in the following equation (3). Additionally, a symbol "∝" in the equation (3) expresses a proportional relationship.

$$dS/dt = d(W \times H)/dt \propto d(f/D)^2/dt \propto d(1/D^2)/dt \qquad (3)$$

The following equation (4) is derived by partially differentiating the above equation (3) with respect to the distance D.

$$dS/dt \propto d(1/D^2)/dt = (-2/D^3) \times (dD/dt) = (-2/D^3) \times V_{s0} \qquad (4)$$

The area change dS/dt of the image of the stopped vehicle can be used as an evaluation index of an approaching/separating state between the vehicle and the stopped vehicle. Hence, the present evaluation index KdB_p between the vehicle and the road associated object as the static object is obtained as expressed in the above equation (1) by making the following calculation. That is, by expressing a result of multiplying the above equation (4) by a constant number in logarithm (decibel [dB]) and then further multiplying the result expressed in logarithm by a constant number, the present evaluation index KdB_p is obtained.

Alternatively, since the present evaluation index KdB_p is obtained from the degree of variation in the area S of an image of the road associated object per unit time dS/dt, the present evaluation index KdB_p may be obtained from a degree of variation in a size of the road associated object in an image taken by the CCD camera 60a per unit time.

Figure 3:
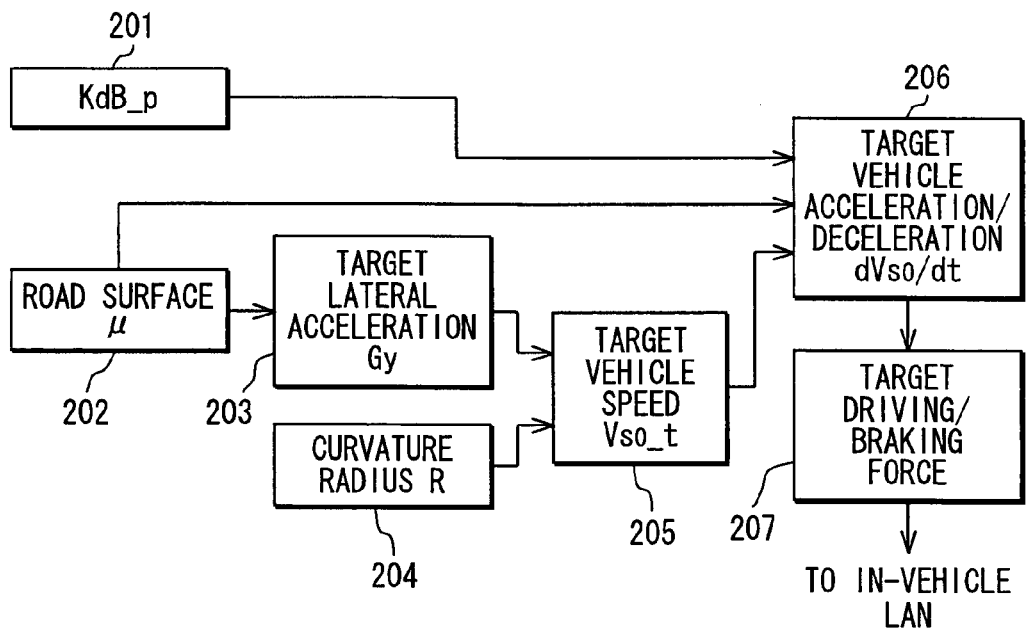
FIG. 3 is a functional block diagram of a vehicle control unit according to the first embodiment.

FIG. 3 shows a functional block diagram of the vehicle control unit 120. An approaching/separating state evaluation index obtaining unit 201 obtains the present evaluation index KdB_p, which is calculated in the evaluation index calculating unit 110.

A road surface μ obtaining unit 202 determines a road surface friction coefficient μ from a road surface state of the road, along which the vehicle is traveling. The road surface state is detected by a road surface state detector (not shown). Alternatively, the road surface friction coefficient μ may be determined, for example, in the following manner. That is, the road surface states such as dryness, moistness, snow covering, and a freeze are related to the road surface friction coefficient μ beforehand, and the driver selects certain road surface states from the dryness, moistness, snow covering, freeze and the like. Then, the road surface friction coefficient μ is determined from the road surface states selected by the driver.

In view of the road surface friction coefficient μ, a target lateral acceleration setting unit 203 sets a target lateral acceleration $G_y$, at which the vehicle aims to travel along the curve. The target lateral acceleration $G_y$ indicates a maximum value of a lateral acceleration, at which the vehicle can travel along the curve safely.

Figure 4:
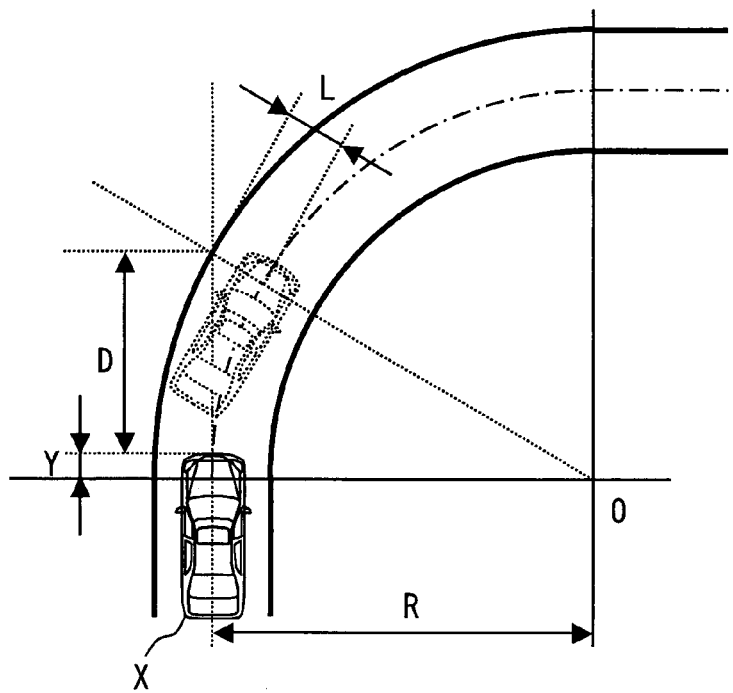
FIG. 4 is an illustrative view illustrating a curvature radius of a curve of a road, a distance between the road associated object and a front end of the vehicle, a distance between the front end of the vehicle and a central axis of a front wheel of the vehicle, and a distance between a central point of width of the vehicle and the road associated object on the central axis of the front wheel according to the first embodiment.

A road curvature radius obtaining unit 204 obtains a curvature radius R of the curve ahead of the vehicle. With reference to FIG. 4, an explanation as to the curvature radius R of the curve will be given below. In addition, in a common road, easement curve zones are formed before and after a circular curve zone as in, a straight road zone→the easement curve (e.g., clothoid, cubical parabola) zone→the circular curve zone→the easement curve zone→the straight road zone. However, in the first embodiment, for the purpose of simplifying the explanation, the curvature radius R of the curve, which consists of the circular curve zone alone as shown in FIG. 4, will be described.

When the curve exists ahead of the vehicle, the curvature radius obtaining unit 204 obtains a distance between a center (O) of a circular curve of the curve and a center line of a passing division of the vehicle as the curvature radius R of the curve.

Alternatively, the road curvature radius obtaining unit 204 may obtain the curvature radius R based on the link data and node data in the road map data, which are outputted from the navigation system 90. As well, the road curvature radius obtaining unit 204 may estimate the curvature radius R of the curve from information about the road associated objects such as the lane marking M1, pole M2, guardrail M3, curbstone M4, reflective plate M5, and delineator M6. The information about the road associated objects is outputted from the radar 70 and the recognition processor 60b. In such a case, when the curvature radius R is estimated from the information about the pole M2, guardrail M3, curbstone M4, reflective plate M5, and delineator M6, an approximated curve may be obtained from the information, thereby obtaining the curvature radius R of the approximated curve.

In addition, as shown in FIG. 4, given the distance D between the vehicle and the road associated object (e.g., the lane marking M1, pole M2, guardrail M3, curbstone M4, reflective plate M5, and delineator M6) located in an extension line of the traveling direction of the vehicle, a distance (Y) between a front end of the vehicle and a central axis of a front wheel of the vehicle, and a distance (L) between a central point of width of the vehicle and the road associated object on the central axis of the front wheel, the following equation (5) is obtained.

$$(D+Y)^2 + R^2 = (R+L)^2 \qquad (5)$$

Thus, the curvature radius R of the curve may be obtained by calculating the following equation (6), which is obtained from the above equation (5).

$$R = \{(D+Y)^2 - L^2\}/2 \times L \qquad (6)$$

A target vehicle speed setting unit 205 sets a target vehicle speed $V_{s0\_t}$, with which the vehicle travels along the curve ahead of the vehicle by calculating the following equation (7) using the target lateral acceleration $G_y$ and the curvature radius R of the curve.

$$V_{s0\_t} = (R \times G_y)^{1/2} \qquad (7)$$

A target vehicle acceleration/deceleration calculating unit 206 compares the present vehicle speed $V_{s0}$ with the target vehicle speed $V_{s0\_t}$. If a difference between the present vehicle speed $V_{s0}$ and the target vehicle speed $V_{s0\_t}$ is smaller than a predetermined difference, the acceleration/deceleration calculating unit 206 calculates the target vehicle acceleration/deceleration to maintain the present vehicle speed $V_{s0}$.

On the other hand, if the above difference is larger than the predetermined difference, the acceleration/deceleration calculating unit 206 obtains a target vehicle acceleration/deceleration $dV_{s0}/dt$ to accelerate or decelerate the vehicle to the target vehicle speed $V_{s0\_t}$ by calculating the following equation (8) using the present evaluation index KdB_p, the distance D between the vehicle and the road associated object located in the extension line of the traveling direction of the vehicle, the vehicle speed $V_{s0}$, and the target vehicle speed $V_{s0\_t}$.

$$dV_{s0}/dt = \text{gain} \times 7.5 \times D^2 \times 10^{\{(|KdB\_p|/10)-8\}} \times (V_{s0}-V_{s0\_t}) \quad (8)$$

The above equation (8), which is obtained from the above equation (1), expresses a target value of a vehicle acceleration/deceleration, which is used for accelerating/decelerating the vehicle to the target vehicle speed $V_{s0\_t}$ with the present evaluation index KdB_p maintained. The equation (8) is obtained in the following manner. First, the equation (1) is transformed into the following equations (9), (10).

$$10^{(|KdB\_p|/10)} = |-2 \times V_{s0}|/(D^3 \times 5 \times 10^{-8}) \quad (9)$$

$$|-V_{s0}| = (D^3 \times 5 \times 10^{-8}/2) \times 10^{(|KdB\_p|/10)} = 2.5 \times D^3 \times 10^{\{(|KdB|/10)-8\}} \quad (10)$$

By differentiating the equation (10) with respect to time, the following equation (11) is obtained.

$$(dV_{s0}/dD) \times (dD/dt) = 7.5 \times D^2 \times 10^{\{(|KdB\_p|/10)-8\}} \times V_{s0} \quad (11)$$

The above equation (11) expresses the target value of the vehicle acceleration/deceleration to maintain the present evaluation index KdB_p. By taking the target vehicle speed $V_{s0\_t}$ into consideration in the equation (11), the target vehicle acceleration/deceleration $dV_{s0}/dt$ is expressed in the following equation (12).

$$dV_{s0}/dt = 7.5 \times D^2 \times 10^{\{(|KdB\_p|/10)-8\}} \times (V_{s0}-V_{s0\_t}) \quad (12)$$

Lastly, the acceleration/deceleration calculating unit 206 calculates a final value of the target vehicle acceleration/deceleration $dV_{s0}/dt$ in the above equation (8) by multiplying the equation (12) by gain, which is a positive value and is equal to or smaller than one. Additionally, the range of the gain will be examined below. When the vehicle, which is approaching the road associated object with the vehicle speed $V_{s0}$, starts to decelerate with a constant vehicle deceleration GG, for example, a travel distance DD, which is traveled by the vehicle until the vehicle stops at a position where the vehicle contacts the road associated object, is expressed in the following equation (13).

$$DD = V_{s0}^2/2 \times GG \quad (13)$$

Following this, a ratio is obtained by the following equation (14) between the vehicle deceleration GG, with which the vehicle travels until the vehicle stops at the position where the vehicle contacts the road associated object, and the target vehicle acceleration/deceleration $dV_{s0}/dt$ (gain=1.000) to maintain the present evaluation index KdB_p.

$$GG/dV_{s0}/dt = (V_{s0}^2/2 \times DD)/(\text{gain} \times 7.5 \times D^2 \times 10^{\{(|KdB\_p|/10)-8\}} \times V_{s0}) = V_{s0}/(15 \times D^3 \times 10^{\{(|KdB\_p|/10)-8\}}) \quad (14)$$

By substituting the equation (10) for the vehicle speed $V_{s0}$ in the above equation (14), the following equation (15) is obtained.

$$GG/dV_{s0}/dt = (2.5 \times D^3 \times 10^{\{(|KdB\_p|/10)-8\}})/(15 \times D^3 \times 10^{\{(|KdB\_p|/10)-8\}}) = 2.5/15 \approx 0.167 \quad (15)$$

Therefore, by setting the gain at 0.167, the target vehicle acceleration/deceleration $dV_{s0}/dt$, with which the vehicle travels in order that the vehicle stops at the position where the vehicle contacts the road associated object, can be calculated. Consequently, the gain covers a range of 0.167 to 1.000.

When the difference between the present vehicle speed $V_{s0}$ and the target vehicle speed $V_{s0\_t}$ is larger than the predetermined difference, and the vehicle speed $V_{s0}$ is larger than the target vehicle speed $V_{s0\_t}$, the target vehicle acceleration/deceleration $dV_{s0}/dt$ calculated by the above equation (8) expresses the deceleration (with a plus sign) with which the vehicle aims to travel. Accordingly, by controlling the vehicle to decelerate such that it travels with the target vehicle acceleration/deceleration $dV_{s0}/dt$, the vehicle speed $V_{s0}$ can be decreased to the target vehicle speed $V_{s0\_t}$ with the present evaluation index KdB_p maintained.

On the other hand, when the vehicle speed $V_{s0}$ is smaller than the target vehicle speed $V_{s0\_t}$, the target vehicle acceleration/deceleration $dV_{s0}/dt$ calculated by the above equation (8) expresses the acceleration (with a minus sign) with which the vehicle aims to travel. Accordingly, by controlling the vehicle to accelerate such that it travels with the target vehicle acceleration/deceleration $dV_{s0}/dt$, the vehicle speed $V_{s0}$ can be increased to the target vehicle speed $V_{s0\_t}$ with the present evaluation index KdB_p maintained.

In addition, the acceleration/deceleration calculating unit 206 may correct the target vehicle acceleration/deceleration $dV_{s0}/dt$ according to the road surface friction coefficient μ on the curve ahead of the vehicle. This is because the target braking force cannot sometimes be obtained due to the road surface friction coefficient μ.

A target driving/braking force calculating unit 207 calculates target driving/braking force to be applied to the vehicle, such that the acceleration or deceleration of the vehicle reaches the target vehicle acceleration/deceleration $dV_{s0}/dt$ calculated by the acceleration/deceleration calculating unit 206, and transmits information about the target driving/braking force to the in-vehicle LAN.

Next, control processing performed in the curve travel ECU 100 will be described with reference to a flowchart in FIG. 6. To begin with, vehicle state quantity (e.g., the vehicle speed $V_{s0}$) is obtained at step 10 (S10). At step 20 (S20), the distance D between the vehicle and the road associated object located in the extension line of the traveling direction of the vehicle is obtained, and the present evaluation index KdB_p of the vehicle is calculated with respect to the road associated object using the distance D. At step 30 (S30), the target vehicle speed $V_{s0\_t}$, with which the vehicle travels along the curve ahead of the vehicle, is calculated (is set).

At step 40 (S40), the present vehicle speed $V_{s0}$ is compared with the target vehicle speed $V_{s0\_t}$ that is set at S30, and it is determined whether the difference between the present vehicle speed $V_{s0}$ and the target vehicle speed $V_{s0\_t}$ is smaller than the predetermined difference. If it is determined that the difference is smaller than the predetermined difference (YES), control proceeds to step 60 (S60), whereas control proceeds to step 50 (S50) if it determined that the difference is not smaller than the predetermined difference (NO).

At S50, if the present vehicle speed $V_{s0}$ is larger than the target vehicle speed $V_{s0\_t}$, the target vehicle deceleration $dV_{s0}/dt$ that is used for decelerating the vehicle to the target vehicle speed $V_{s0\_t}$ is calculated. If the present vehicle speed $V_{s0}$ is smaller than the target vehicle speed $V_{s0}$ t, the target vehicle acceleration $dV_{s0}/dt$ that is used for accelerating the vehicle to the target vehicle speed $V_{s0\_t}$ is calculated.

The target vehicle acceleration/deceleration to maintain the present vehicle speed $V_{s0}$ is calculated at S60. At step 70 (S70), the target driving/braking force to be applied to the vehicle such that the acceleration or deceleration of the vehicle reaches the target vehicle acceleration/deceleration calculated at S50 or S60 is calculated, the information about the target driving/braking force is transmitted to the in-vehicle LAN.

Accordingly, if the present vehicle speed $V_{s0}$ is larger than the target vehicle speed $V_{s0\_t}$, the vehicle is controlled to decelerate, so that the deceleration of the vehicle reaches the target vehicle deceleration $dV_{s0}/dt$. On the other hand, if the present vehicle speed $V_{s0}$ is smaller than the target vehicle speed $V_{s0\_t}$, the vehicle is controlled to accelerate, so that the acceleration of the vehicle reaches the target vehicle acceleration $dV_{s0}/dt$. As a result, the vehicle can be decelerated or accelerated based on the target vehicle speed $V_{s0\_t}$, with which the vehicle travels along the curve ahead of the vehicle.

When the difference between the present vehicle speed $V_{s0}$ and the target vehicle speed $V_{s0\_t}$ is smaller than the predetermined difference, the vehicle is controlled to maintain the present vehicle speed $V_{s0}$, thereby assisting the driver of the vehicle with his/her drive operation of the vehicle when the vehicle travels along the curve with a speed, which is possible to travel, being maintained.

As described thus far, when the vehicle travels along the curve, the vehicle drive assist system of the first embodiment calculates the target vehicle acceleration/deceleration $dV_{s0}/dt$ that is used for accelerating or decelerating the vehicle to the target vehicle speed $V_{s0\_t}$, which is set for the curve. Based on the comparison between the present vehicle speed $V_{s0}$ and the target vehicle speed $V_{s0\_t}$, the vehicle is controlled, such that the acceleration/deceleration of the vehicle reaches the target vehicle acceleration/deceleration $dV_{s0}/dt$.

Consequently, when the vehicle travels along the curve of the road that exists ahead of the vehicle, the vehicle can be accelerated or decelerated to the speed possible to travel, thereby assisting the driver with his/her drive operation of the vehicle in a comprehensive manner when the vehicle travels along the curve.

First Modification

The target lateral acceleration $G_y$ may be set differently according to a size of the curvature radius R of the curve. As a result, the driver can be assisted in performing the drive operation in a sporty manner.

Second Modification

Moreover, when the driver keeps the steering of the vehicle at a constant steering angle, for example, the target vehicle speed $V_{s0\_t}$ may be set at 0 (zero) to control the vehicle to decelerate.

Third Modification

In addition, although the vehicle drive assist system of the first embodiment controls a vehicle to accelerate or decelerate, it may control the vehicle only to accelerate, or only to decelerate.

Second Embodiment

Because a second embodiment and the first embodiment have a number of common features, a detailed explanation as to the common features will be omitted, and the explanation will be given with emphasis on different features. The vehicle drive assist system of the first embodiment calculates the target vehicle acceleration/deceleration $dV_{s0}/dt$ that is used for accelerating or decelerating the vehicle, from the distance D between the vehicle and the road associated object located on the curve of the road, the target vehicle speed $V_{s0\_t}$, which is set based on the curvature radius R of the curve, and the like, provided that an object, which creates an obstruction to travel of the vehicle, does not exist on the curve that exists ahead of the vehicle in its traveling direction. Then, the vehicle is controlled to accelerate or decelerate, such that the acceleration or deceleration of the vehicle reaches the target vehicle acceleration/deceleration $dV_{s0}/dt$.

On the other hand, the vehicle drive assist system of the second embodiment operates in the same manner as the vehicle drive assist system of the first embodiment if the obstruction does not exist on the curve. However, the system of the second embodiment differs from that of the first embodiment in that it controls the vehicle to decelerate to avoid a collision with the obstruction if the obstruction does exist on the curve.

Figure 7:
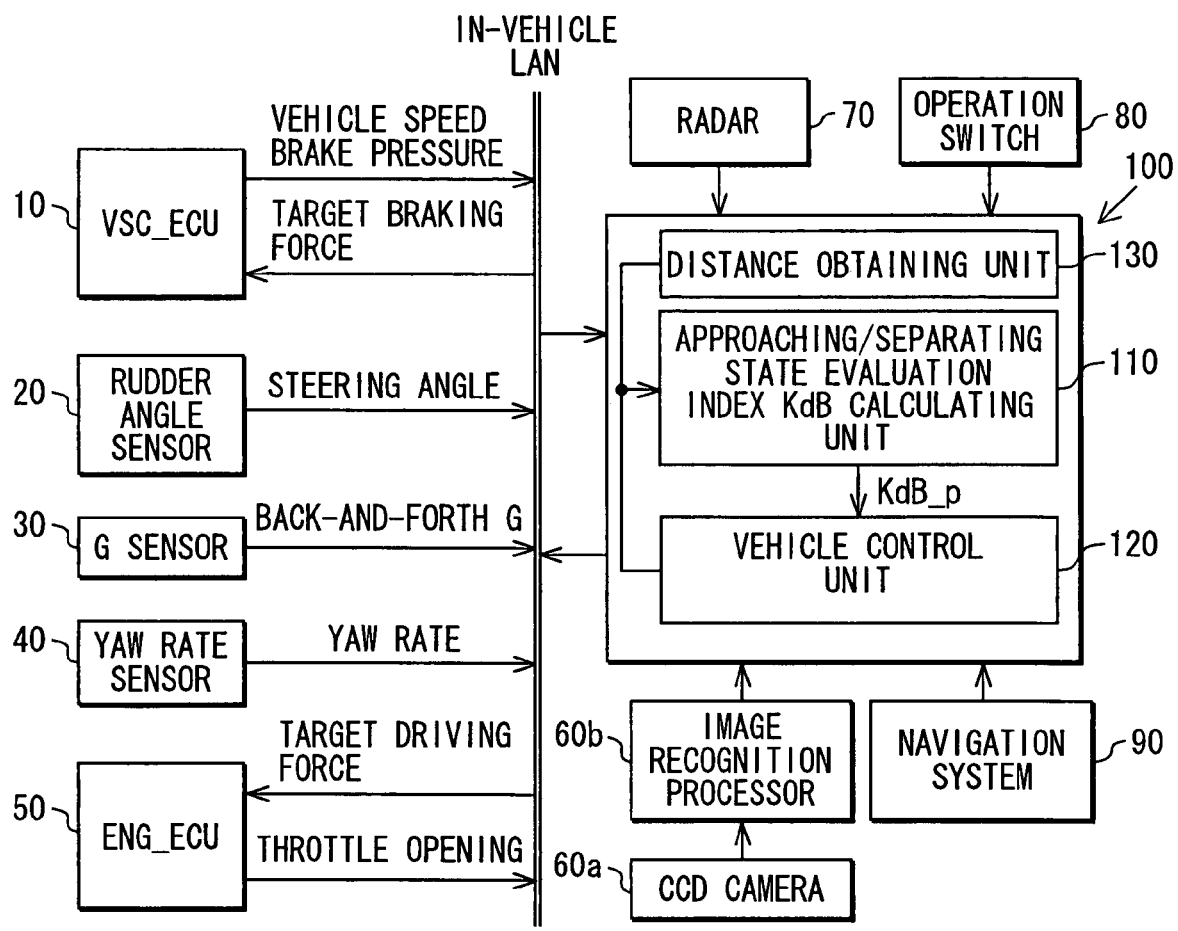
FIG. 7 is a block diagram showing an overall configuration of a vehicle drive assist system according to a second embodiment of the present invention.

FIG. 7 shows an overall configuration of the vehicle drive assist system of the second embodiment. Except for an image recognition processor 60b and a radar 70, components (i.e., a VSC_ECU 10, a rudder angle sensor 20, a G sensor 30, a yaw rate sensor 40 an ENG_ECU 50, a CCD camera 60a, an operation switch 80, a navigation system 90, and a curve travel ECU 100) operate in the same manner as corresponding components indicated by the same numerals in the first embodiment.

As described in the first embodiment, the recognition processor 60b performs predetermined image recognition processing on an image that is outputted from the CCD camera 60a to recognize the road associated object on the curve ahead of the vehicle, and recognizes the obstruction when it exists on the curve. The recognition processor 60b outputs information about a type of the road associated object and a relative position of the road associated object to the vehicle to the curve travel ECU 100. As well, when the obstruction exists on the curve, the recognition processor 60b outputs information about a size (i.e., width and height) of the obstruction and a relative position of the obstruction to the vehicle to the curve travel ECU 100. In addition, by determining the size of the obstruction in combination with a result of detection by the radar 70, accuracy of the information about the size of the obstruction can be improved.

The radar 70, for example, applies a laser light to a predetermined range ahead of the vehicle and receives a reflected light to detect a distance to the road associated object or the obstruction, a deviation amount (lateral deviation amount) of a central axis of the road associated object or the obstruction from a widthwise central axis of the vehicle, a relative speed of the vehicle to the road associated object or the obstruction, and the like, and outputs them to the curve travel ECU 100.

The curve travel ECU 100 includes an approaching/separating state evaluation index calculating unit 110, a vehicle control unit 120 and a distance obtaining unit 130. The distance obtaining unit 130 obtains the information about the road associated object or the obstruction from the image recognition processor 60b and the radar 70. As well, the distance obtaining unit 130 obtains information (e.g., the vehicle speed, relative speed, steering angle, back-and-forth acceleration, and yaw rate) about a traveling state of the vehicle via the in-vehicle LAN.

Based on the information about the traveling state of the vehicle, the distance obtaining unit 130 estimates a future locus (a virtual track that would be left along the road if the vehicle travels with its present traveling state maintained) of the vehicle. As indicated by dashed lines in FIG. 10A, when the vehicle is in a state of traveling straight ahead, for example, the distance obtaining unit 130 estimates the future locus of the vehicle that would be obtained if the vehicle travels with its state of traveling straight ahead maintained. In the second embodiment, as shown in FIG. 10B, the future locus of a projection plane (width $W_s$ and height $H_s$) of the vehicle is estimated. That is, a three-dimensional (i.e., a traveling direction, width direction, and height direction of the vehicle) future locus is estimated.

Figure 10A:
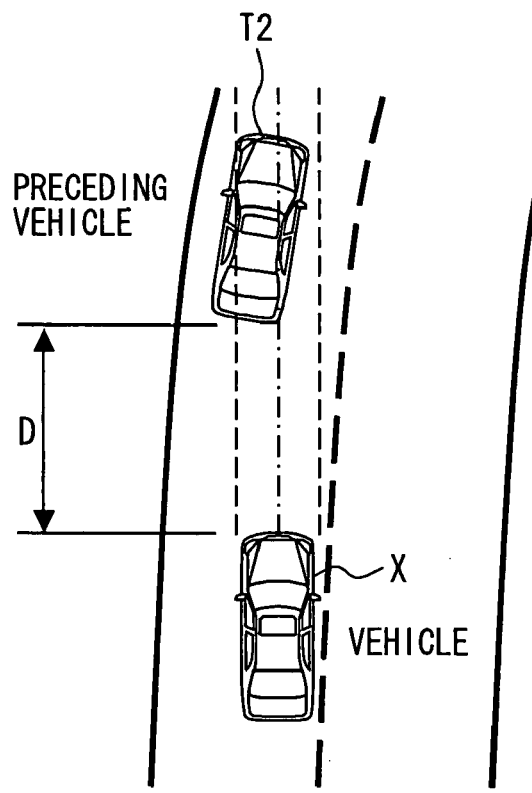
FIG. 10A is an illustrative view illustrating a future locus of a projection plane of the vehicle.
Figure 10B:
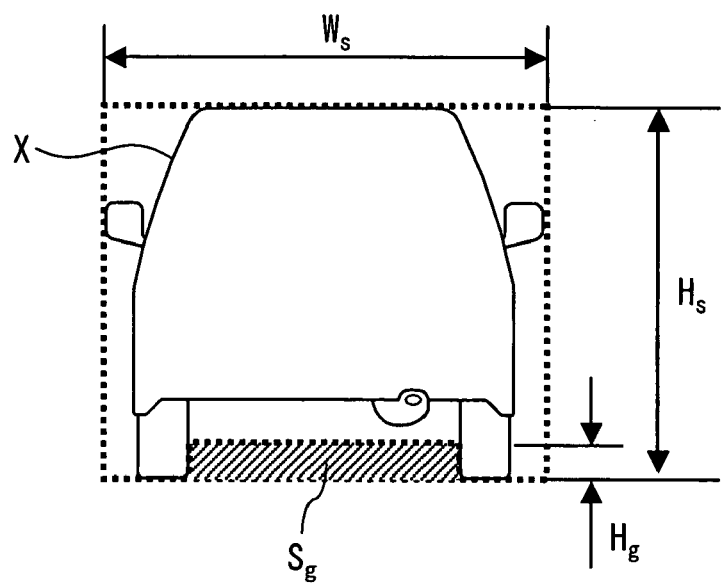
FIG. 10B is an illustrative view illustrating the projection plane of the vehicle.

If the obstruction (e.g., a vehicle traveling ahead of the vehicle (i.e., a preceding vehicle) in FIG. 10A), which overlaps with the estimated future locus of the projection plane of the vehicle, exists on the curve, the distance obtaining unit 130 obtains a distance D between the obstruction and the vehicle. Accordingly, an obstruction that does not overlap with the future locus of the projection plane is excluded from obtainment of the distance D because of a small possibility of the collision with the vehicle, whereas the distance D to the obstruction that has a strong possibility of the collision with the vehicle can be obtained. Additionally, if there is a plurality of obstructions that overlap with the future locus of the projection plane, the distance to the obstruction that is located closest to the vehicle is obtained.

If the obstruction that overlaps with the future locus of the projection plane of the vehicle does not exist on the curve, on the other hand, the distance D between the vehicle and the road associated object located in the extension line of the traveling direction of the vehicle (i.e., in an extension line of a center line of the future locus of the projection plane of the vehicle) is obtained as described in the first embodiment with reference to FIG. 4.

In addition, when estimating the future locus of the projection plane of the vehicle, the distance obtaining unit 130 may take into account a minimum ground clearance $H_g$ of the vehicle as shown in FIG. 10B. For example, since a cat's-eye that is laid on the road along its center line does not obstruct the way of the vehicle, it needs to be excluded from obtainment of the distance D. Accordingly, by taking into account the minimum ground clearance $H_g$, that is, by estimating the future locus of the projection plane, from which an area $S_g$ under a floor of the vehicle is excluded, the object that does not obstruct the way of the vehicle can be excluded from obtainment of the distance D.

When the obstruction that overlaps with the future locus of the projection plane of the vehicle exists on the curve, the evaluation index calculating unit 110 calculates the present evaluation index KdB_p between the vehicle and the obstruction by the following equation (16) using the distance D between the vehicle and the obstruction, which is obtained by the distance obtaining unit 130, and a relative speed $V_r$ of the vehicle to the obstruction.

Additionally, a sign | | in the equation (16) expresses an absolute value. The relative speed $V_r$ is indicated with a minus sign (−) when the vehicle approaches the obstruction, and with a plus sign (+) when the vehicle travels away from the obstruction. As regards a sign (+, −) of the present evaluation index KdB_p, signs are assigned such that the present evaluation index KdB_p becomes larger than 0 (zero) (KdB_p>0) if the relative speed $V_r$ is smaller than 0 (zero) ($V_r$<0, approaching), and that the present evaluation index KdB_p becomes smaller than 0 (zero) (KdB_p<0) if the relative speed $V_r$ is larger than 0 (zero) ($V_r$>0, separating).

$$KdB\_p=10\times\log\{|-2\times V_r|/(D^3\times 5\times 10^{-8})\} \quad (16)$$

When the obstruction that overlaps with the future locus of the projection plane does not exist on the curve, the evaluation index calculating unit 110 calculates the present evaluation index KdB_p between the vehicle and the road associated object by the following equation (17) (which is explained in the first embodiment) using the distance D between the vehicle and the road associated object, which is obtained by the distance obtaining unit 130, and the vehicle speed $V_{s0}$.

$$KdB\_p=10\times\log\{|-2\times V_{s0}|/(D^3\times 5\times 10^{-8})\} \quad (17)$$

Figure 8:
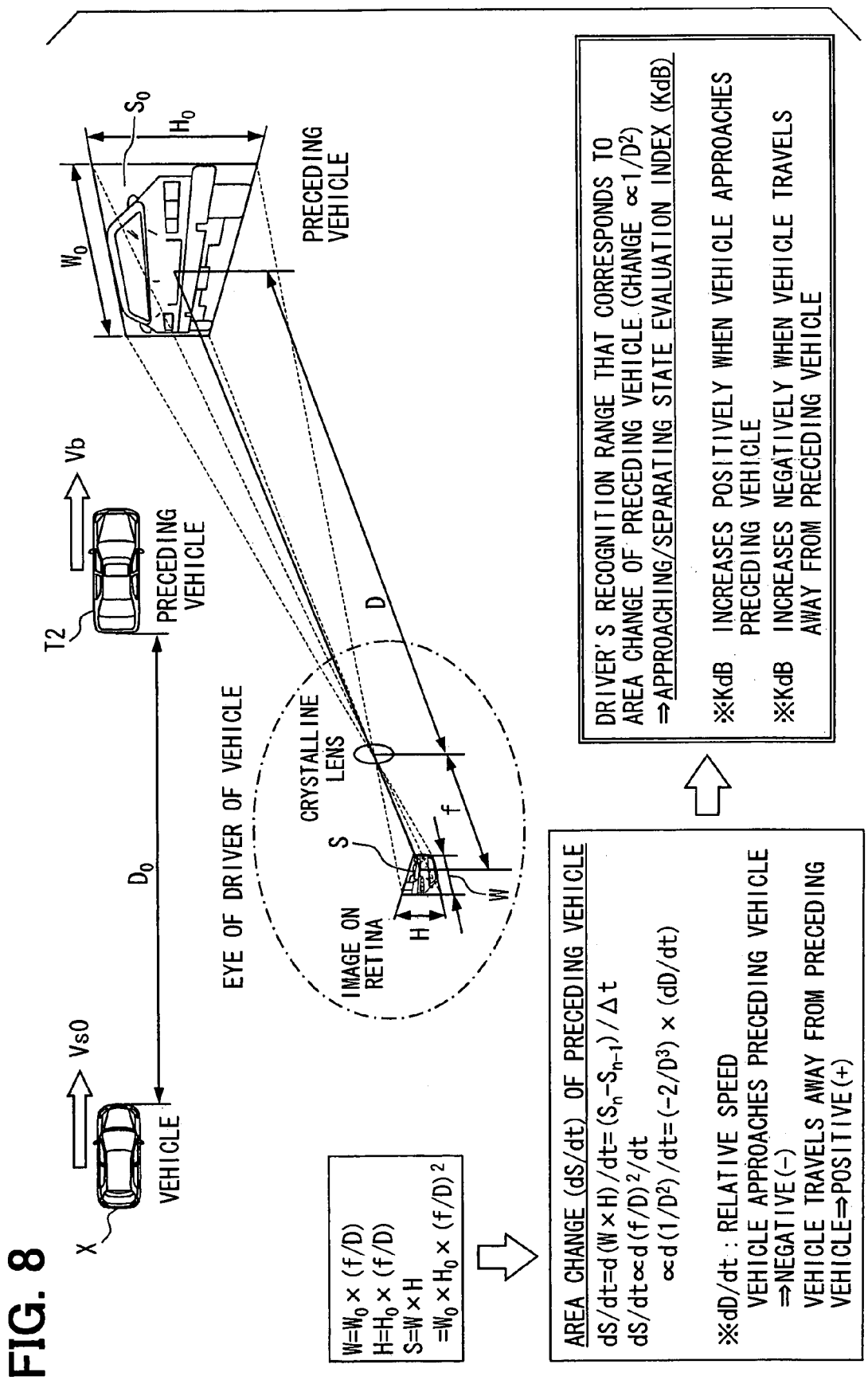
FIG. 8 is an illustrative view illustrating the present approaching/separating state evaluation index between the vehicle and an obstruction such as a preceding vehicle.

An explanation as to the above equation (16) will be given below. When the preceding vehicle exists ahead of the vehicle in its traveling direction as shown in FIG. 8, for example, an area (S) of an image of the preceding vehicle is expressed in the following equation (18), given actual height ($H_0$) and width ($W_0$) of the preceding vehicle, an area ($S_0(=W_0\times H_0)$), height (H) and width (W) of the image of the preceding vehicle, which is projected on (the retina of) the eye of the driver of the vehicle, the area (S(=W×H)), a distance (D, which equals a distance $D_0$ between the preceding vehicle and the vehicle for convenience sake) between the preceding vehicle and (the crystalline lens of) the eye of the driver, and a focal length (f) of the eye of the driver.

$$S=W\times H=W_0\times H_0\times (f/D)^2 \quad (18)$$

A degree of variation in the area S of the image of the preceding vehicle per unit time (i.e., area change of the image of the preceding vehicle: dS/dt) is expressed in the following equation (19). Additionally, a symbol "∝" in the equation (19) expresses a proportional relationship.

$$dS/dt=d(W\times H)/dt \propto d(f/D)^2/dt \propto d(1/D^2)/dt \quad (19)$$

The following equation (20) is derived by partially differentiating the above equation (19) with respect to the distance D. "$V_r$" in the equation (20) expresses a relative speed of the vehicle to the preceding vehicle.

$$dS/dt \propto d(1/D^2)/dt=(-2/D^3)\times (dD/dt)=(-2/D^3)\times V_r \quad (20)$$

The area change dS/dt of the image of the preceding vehicle can be used as an evaluation index of an approaching or separating state between the vehicle and the preceding vehicle. Hence, the present evaluation index KdB_p between the vehicle and the obstruction is obtained as expressed in the above equation (16) by making the following calculation. That is, by expressing a result of multiplying the above equation (20) by a constant number in logarithm (decibel [dB]) and then further multiplying the result expressed in logarithm by a constant number, the present evaluation index KdB_p is obtained.

Alternatively, since the present evaluation index KdB_p is obtained from the degree of variation in the area S of the image of the obstruction per unit time dS/dt, the present evaluation index KdB_p may be obtained from a degree of variation in a size of the obstruction in the image taken by the CCD camera 60a per unit time.

Figure 9:
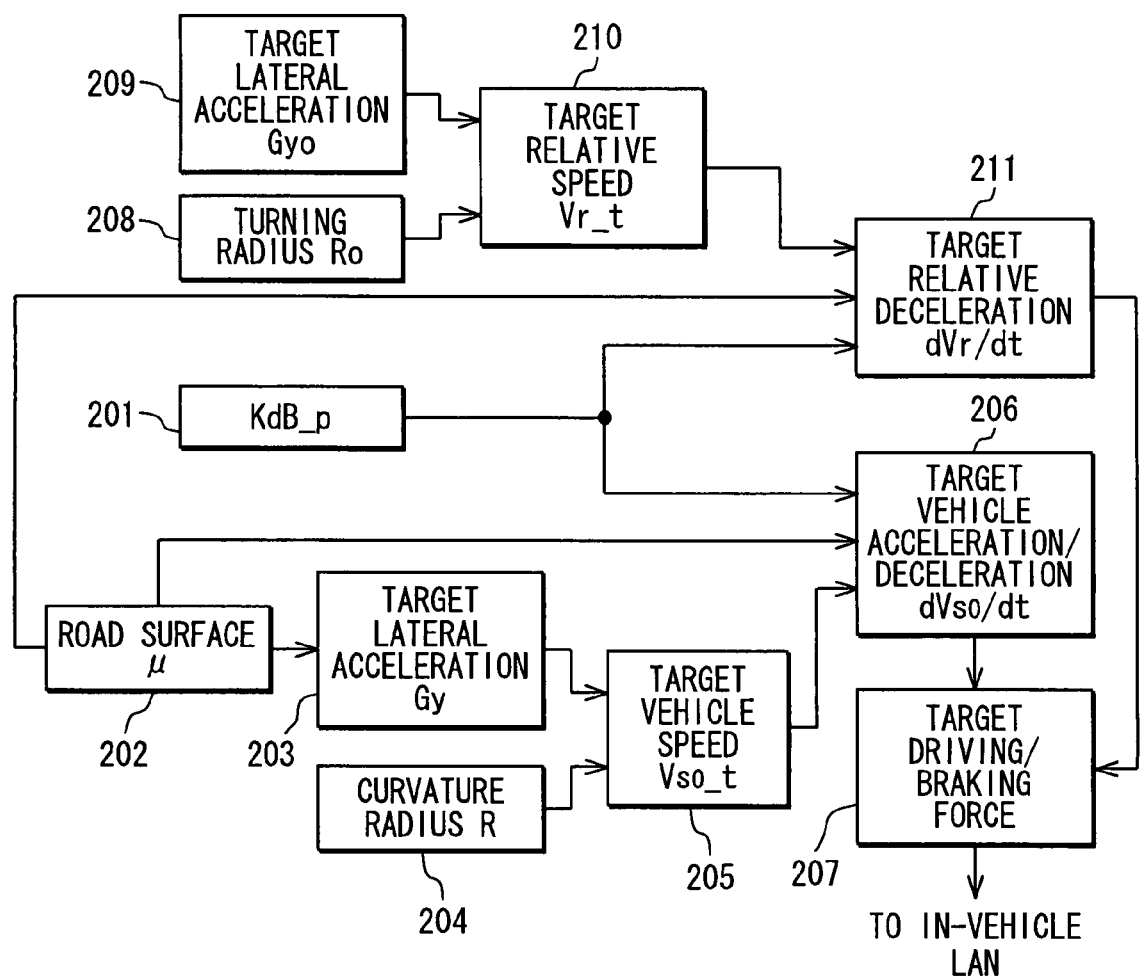
FIG. 9 is a functional block diagram of a vehicle control unit according to the second embodiment.

FIG. 9 shows a functional block diagram of the vehicle control unit 120. A road surface μ obtaining unit 202, a target lateral acceleration setting unit 203, a road curvature radius obtaining unit 204, a target vehicle speed setting unit 205, and a target vehicle acceleration/deceleration calculating unit 206 in FIG. 9 operate in the same manner as corresponding components indicated by the same numerals in the first embodiment. An approaching/separating state evaluation index obtaining unit 201 obtains the present evaluation index KdB_p, which is calculated in the evaluation index calculating unit 110.

Figure 11:
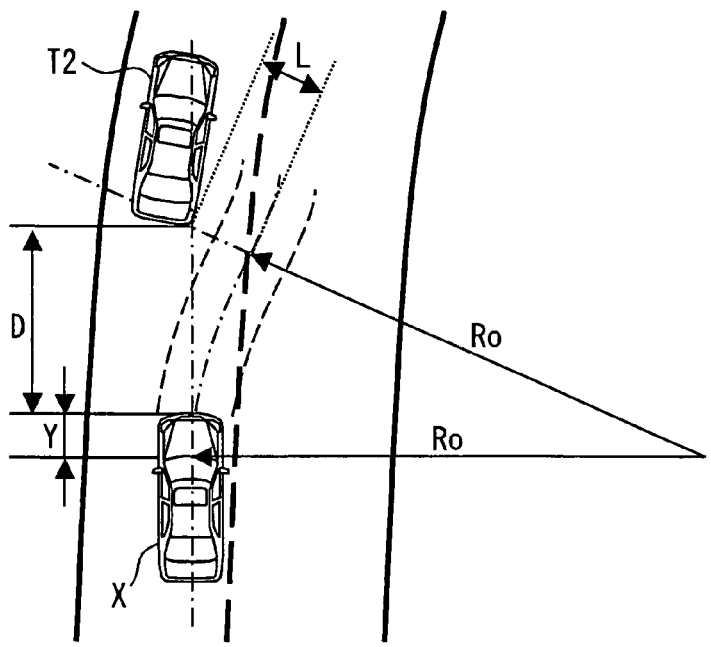
FIG. 11 is an illustrative view illustrating a turning radius that is necessary for the vehicle to avoid a collision with the preceding vehicle.

A turning radius calculating unit 208 calculates a turning radius $R_0$ of the vehicle that is necessary for the vehicle to avoid the collision with the obstruction, based on the distance D between the vehicle and the obstruction, which is obtained by the distance obtaining unit 130. As shown in FIG. 11, when the preceding vehicle as the obstruction exists ahead of the vehicle with the distance D therebetween, for example, the following equation (21) is obtained given a distance (Y) between a front end of the vehicle and a central axis of a front wheel of the vehicle, and a distance (L) between a central point of width of the vehicle and a right rear end of the preceding vehicle.

$$(D+Y)^2 + R_o^2 = (R_o+L)^2 \quad (21)$$

Therefore, the turning radius $R_0$ is calculated by the following equation (22), which is obtained from the above equation (21).

$$R_o = \{(D+Y)^2 - L^2\}/2 \times L \quad (22)$$

A steer target lateral acceleration setting unit 209 sets a target value $G_{yo}$ of the lateral acceleration, which is generated in a lateral direction of the vehicle as a result of a steering operation to avoid the collision by the driver of the vehicle. For example, the target lateral acceleration $G_{yo}$ may be set at approximately 0.2 [G].

A target relative speed calculating unit 210 calculates a target relative speed $V_{r\_t}$ between the vehicle and the obstruction by the following equation (23), using the turning radius $R_0$ calculated by the turning radius calculating unit 208 and the target lateral acceleration $G_{yo}$ that is set by the steer target lateral acceleration setting unit 209.

$$V_{r\_t} = (R_o \times G_{yo})^{1/2} \quad (23)$$

A target relative deceleration calculating unit 211 obtains a target relative deceleration $dV_r/dt$ that is used for decelerating the vehicle to the target relative speed by the following equation (24), using the distance D between the vehicle and the obstruction, which is obtained by the distance obtaining unit 130, the relative speed $V_r$ between the vehicle and the obstruction, the present evaluation index KdB_p between the vehicle and the obstruction, and the target relative speed $V_{r\_t}$.

$$dV_r/dt = 7.5 \times D^2 \times 10^{\{(|KdB-p|/10)-8\}} \times (V_r - V_{r\_t}) \quad (24)$$

The above equation (24) is obtained from the equation (16). First, the equation (16) is transformed into the following equations (25), (26).

$$10^{(|KdB-p|/10)} = |-2 \times V_r|/(D^3 \times 5 \times 10^{-8}) \quad (25)$$

$$|-V_r| = (D^3 \times 5 \times 10^{-8}/2) \times 10^{(|KdB-p|/10)} = 2.5 \times D^3 \times 10^{\{(|KdB|/10)-8\}} \quad (26)$$

Thus, the target relative deceleration $dV_r/dt$ between the vehicle and the obstruction is calculated by the following equation (27) using the distance D, the relative speed $V_r$, and the present evaluation index KdB_p.

$$dV_r/dt = (dV_r/dD) \times (dD/dt) = 7.5 \times D^2 \times 10^{\{(|KdB-p|/10)-8\}} \times V_r \quad (27)$$

The target relative deceleration $dV_r/dt$ in the above equation (27) expresses a target relative deceleration that is used for decelerating the vehicle to the target relative speed $V_{r\_t}$ with the present evaluation index KdB_p maintained.

Lastly, by taking into consideration the target relative speed $V_{r\_t}$ between the vehicle and the obstruction, a formula for computation of the target relative deceleration $dV_r/dt$ is expressed in the following equation (28).

$$dV_r/dt = 7.5 \times D^2 \times 10^{\{(|KdB-p|/10)-8\}} \times (V_r - V_r) \quad (28)$$

In the above equation (28), if the target relative speed $V_{r\_t}$ is smaller than 0 (zero) ($V_{r\_t} < 0$), the target relative deceleration $dV_r/dt$ is smaller than the target relative deceleration $dV_r/dt$ that is calculated with the target relative speed $V_{r\_t}$ being 0 (zero). Hence, by controlling the vehicle such that it travels with the target relative deceleration $dV_r/dt$, the present relative speed $V_r$ can be decreased to the target relative speed $V_{r\_t}$.

On the other hand, if the target relative speed $V_{r\_t}$ is larger than 0 (zero) ($V_{r\_t} > 0$), the target relative deceleration $dV_r/dt$ is larger than the target relative deceleration $dV_r/dt$ that is calculated with the target relative speed $V_{r\_t}$ being 0 (zero). Hence, by controlling the vehicle such that it travels with the target relative deceleration $dV_r/dt$, the present relative speed $V_r$ can be decreased to the target relative speed $V_{r\_t}$ in the separating state.

In addition, by multiplying the above equation (28) by gain (a positive value that is equal to or smaller than one), the target relative deceleration calculating unit 211 may calculate a final value of the target relative deceleration $dV_r/dt$, which is expressed in the following equation (29).

$$dV_r/dt = \text{gain} \times 7.5 \times D^2 \times 10^{\{(|KdB-p|/10)-8\}} \times (V_r - V_{r\_t}) \quad (29)$$

The range of the gain will be examined below. When the vehicle, which is approaching the stopped obstruction with the vehicle speed $V_{so} (= V_r)$, starts to decelerate with a constant vehicle deceleration GG, a travel distance DD, which is traveled by the vehicle until the vehicle stops at a position where the vehicle contacts the obstruction, is expressed in the following equation (30).

$$DD = V_r^2/2 \times GG \quad (30)$$

Following this, a ratio is obtained by the following equation (31) between the vehicle deceleration GG, with which the vehicle travels until the vehicle stops at the position where the vehicle contacts the obstruction, and the target relative deceleration $dV_r/dt$ (gain=1.000) to maintain the present evaluation index KdB_p.

$$GG/(dV_r/dt) = (V_r^2/2 \times DD)/(\text{gain} \times 7.5 \times D^2 \times 10^{\{(|KdB-p|/10)-8\}} \times V_r) = V_r/(15 \times D^3 \times 10^{\{(|KdB-p|/10)-8\}}) \quad (31)$$

By substituting the equation (26) for the relative speed $V_r$ in the above equation (31), the following equation (32) is obtained.

$$GG/(dV_r/dt) = (2.5 \times D^3 \times 10^{\{(|KdB-p|/10)-8\}})/(15 \times D^3 \times 10^{\{(|KdB-p|/10)-8\}}) = 2.5/15 \cong 0.167 \quad (32)$$

Therefore, when the gain is set at 1.000, by controlling the vehicle such that it travels with the target relative deceleration of the moment, the vehicle can be decelerated with the present evaluation index KdB_p maintained. Furthermore, by setting the gain at 0.167, the target relative deceleration, which is used in order that the vehicle stops at the position where the vehicle contacts the obstruction, can be obtained. Accordingly, it is preferable that the gain should fall within the range of 0.167 to 1.000.

In addition, the target relative deceleration calculating unit 211 may calculate a maximum deceleration that can possibly be generated in the vehicle based on the road surface friction coefficient μ on the curve ahead of the vehicle. Then, the target relative deceleration may be corrected such that it becomes smaller than the maximum deceleration.

According to Coulomb's law of friction, it is known that lateral force F and braking force (or driving force) T that are applied to tires of the vehicle must satisfy the following equation (33) in under any circumstance. Signs "μ" and "$H_w$" in the equation (33) express the road surface friction coefficient and a vertical load of the tire, respectively.

$$\sqrt{(F^2+T^2)} \leq (\mu \times H_w) \quad (33)$$

That is, the resultant of forces in all directions in a horizontal plane, which are applied between the tire and a road surface, cannot be equal to or more than a result of multiplying the vertical load ($H_w$) of the moment by the road surface friction coefficient μ. A vector of the resultant falls within a circle (which is generally referred to as a "friction circle") with radius ($\mu \times H_w$).

Consequently, if the maximum deceleration, which is calculated based on the road surface friction coefficient μ, is generated in the vehicle, the lateral force F of the moment equals 0 (zero). As a result, the traveling direction of the vehicle cannot be changed despite the steering operation to avoid the collision by the driver of the vehicle, thereby making it impossible to avoid the collision with the obstruction.

Therefore, by correcting the target relative deceleration such that a relative deceleration generated in the vehicle reaches, for example, 50-60% of the maximum deceleration, and controlling the vehicle according to the corrected target relative deceleration, the lateral force F during the steering operation is secured, thereby making it possible to avoid the collision with the obstruction.

When the obstruction, which overlaps with the future locus of the projection plane of the vehicle, exists on the curve, and the relative speed $V_r$ between the vehicle and the obstruction is larger than the target relative speed $V_{r\_t}$, the target driving/braking force calculating unit 207 calculates the target braking force, which is applied in order that the relative deceleration generated in the vehicle reaches the target relative deceleration $dV_r/dt$, and transmits the information about the target braking force to the in-vehicle LAN. When the obstruction, which overlaps with the future locus of the projection plane of the vehicle, does not exist on the curve, on the other hand, the target driving/braking force calculating unit 207 calculates the target driving/braking force, which is applied in order that the acceleration or deceleration of the vehicle reaches the target vehicle acceleration/deceleration $dV_{s0}/dt$ calculated by the target vehicle acceleration/deceleration calculating unit 206, and transmits the information about the target driving/braking force to the in-vehicle LAN.

Figure 12:
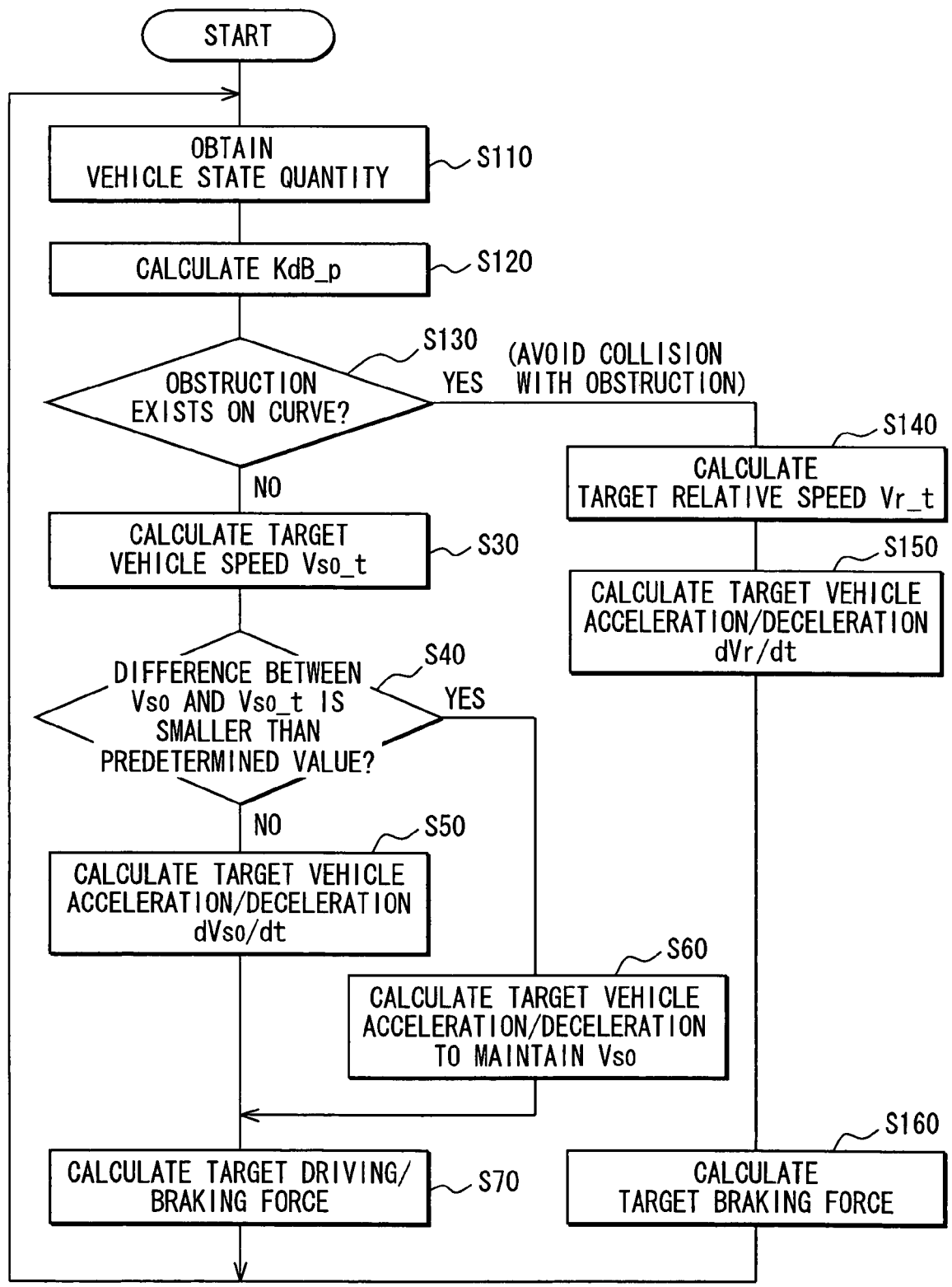
FIG. 12 is a flowchart showing control processing performed in a curve travel ECU according to the second embodiment.

Next, control processing performed by the curve travel ECU 100 will be described with reference to a flowchart in FIG. 12. An explanation as to processing performed at step 30 (S30) to step 60 (S60) will be omitted, since it is similar to the processing described in the first embodiment.

At step 110 (S110), information (i.e., vehicle state quantity) about the traveling state of the vehicle such as the vehicle speed $V_{s0}$ and the relative speed $V_r$ is obtained. At step 120 (S120), the distance D between the vehicle and the obstruction is obtained if the obstruction, which overlaps with the future locus of the projection plane of the vehicle, exists on the curve, whereas the distance D between the vehicle and the road associated object located in the extension line of the traveling direction of the vehicle is obtained if the obstruction, which overlaps with the future locus, does not exist on the curve. Then, the present evaluation index KdB_p between the vehicle and the obstruction or the road associated object is calculated using the distance D at S120.

At step 130 (S130), it is determined whether the obstruction, which overlaps with the future locus of the projection plane of the vehicle, exists on the curve. If the obstruction exists (YES), control proceeds to step 140 (S140), whereas control proceeds to step 30 (S30) if the obstruction does not exist (NO).

At S140, the target relative speed $V_{r\_t}$ between the vehicle and the obstruction is calculated from the turning radius $R_0$ and the target lateral acceleration $G_{yo}$. At step 150 (S150), the target relative deceleration $dV_r/dt$ that is used for decelerating the vehicle to the target relative speed $V_{r\_t}$ is calculated. At step 160 (S160), the target braking force, which is applied in order that the relative deceleration generated in the vehicle reaches the target relative deceleration $dV_r/dt$, is calculated and transmitted to the in-vehicle LAN. After this, each step described above is repeatedly executed with predetermined timing.

As described thus far, when the obstruction exists on the road ahead of the vehicle in its traveling direction, the vehicle drive assist system of the second embodiment calculates the approaching/separating state evaluation index for the obstruction. At the same time, the vehicle drive assist system calculates the target relative speed between the vehicle and the obstruction from the target lateral acceleration and the turning radius of the vehicle, which is necessary for the vehicle to avoid the collision with the obstruction. If the relative speed between the vehicle and the obstruction is larger than the target relative speed, the vehicle drive assist system controls the vehicle to decelerate such that the relative deceleration generated in the vehicle reaches the target relative deceleration.

Accordingly, even if the obstruction (e.g., a parked vehicle and a pedestrian) exists on the curve, the controlling of the vehicle such that the relative deceleration generated in the vehicle reaches the target relative deceleration can assist the driver of the vehicle with his/her drive operation of the vehicle in a comprehensive manner when the vehicle travels along the curve, thereby making it possible to avoid the collision with the obstruction.

On the other hand, when the obstruction does not exist on the curve, the vehicle is controlled so that the acceleration/deceleration of the vehicle reaches the target vehicle acceleration/deceleration, based on the comparison between the target vehicle speed and the vehicle speed. Consequently, during the course of traveling along the curve, the vehicle can be decelerated or accelerated to the speed possible to travel, thereby assisting the driver with his/her drive operation of the vehicle in a comprehensive manner when the vehicle travels along the curve.

Fourth Modification

Although the second embodiment is aimed at avoiding the collision with the obstruction on the curve, it may also be applied to the case where the collision with the obstruction on a straight road is avoided.

Third Embodiment

Figure 13:
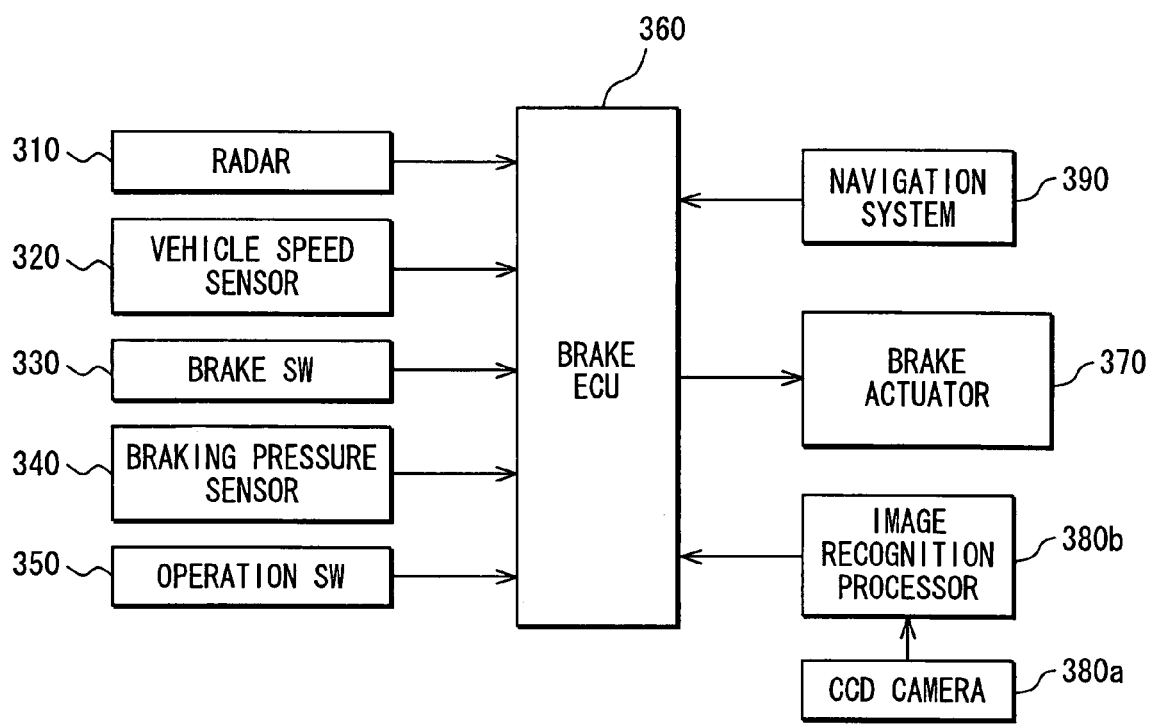
FIG. 13 is a block diagram showing an overall configuration of a vehicle brake control system according to a third embodiment of the present invention.

FIG. 13 shows an overall configuration of a vehicle drive assist system (vehicle brake control system), to which the vehicle control system of the present invention is applied. As shown in FIG. 13, the present vehicle brake control system includes a radar 310, a vehicle speed sensor 320, a brake switch (SW) 330, a braking pressure sensor 340, an operation switch (SW) 350, a brake ECU 360, a brake actuator 370, a CCD camera 380a, an image recognition processor 380b, and a navigation system 390.

The radar 310, for example, applies a laser light to a predetermined range ahead of the vehicle and receives a reflected light to detect distances to the road associated objects such as the reflective plate M5 and the delineator M6, deviation amounts (lateral deviation amounts) of central axes of the road associated objects from the widthwise central axis of the vehicle, and the like. The reflective plate M5 indicates the reflected light intensity that is equal to or higher than the predetermined intensity, and the road associated objects are located at the boundary of the curve of the road or in its vicinity as shown in FIGS. 5A, 5B. Then, the radar 310 outputs information about the distances to the road associated objects, the lateral deviation amounts and the like to the brake ECU 360.

The vehicle speed sensor 320 detects a traveling speed of the vehicle. Since the road associated objects detected by the radar 310 are fixed on the road, the relative speed $V_r$ between the vehicle and the road associated object equals the vehicle speed. In addition, in the third embodiment, a sign of the relative speed $V_r$ is defined as a minus sign (−) when the vehicle approaches the road associated object, and as a plus sign (+) when the vehicle travels away from the road associated object.

The brake SW 330 detects a brake operation by the driver of the vehicle. The brake SW 330 outputs an ON signal when a brake pedal is depressed, and outputs an OFF signal when the depression is released.

The braking pressure sensor 340 detects a brake fluid pressure, which is generated in a brake system (not shown) when the brake pedal is depressed by the driver. The brake system generates the braking force to decelerate the vehicle by, for example, pressing disc pads against a disc rotor that is fixed to a wheel with force, which corresponds to the brake fluid pressure. Accordingly, from the brake fluid pressure, which is generated when the driver operates the brake pedal, a deceleration generated in the vehicle by that brake operation can be estimated.

The operation SW 350 is operated by the driver, and an operation signal is inputted into the brake ECU 360. In addition, when the brake ECU 360 assistively controls the brake operation by the driver, the operation SW 350 gives a command to regulate a degree of deceleration (e.g., to decelerate the vehicle gently or rapidly) to the brake ECU 360.

The brake actuator 370 arbitrarily regulates the brake fluid pressure in the brake system in accordance with a command signal from the brake ECU 360 (which will be described in detail below).

The CCD camera 380a is an image taking means for taking an image of a predetermined range ahead of the vehicle, and outputs the image to the image recognition processor 380b. The image recognition processor 380b performs predetermined image recognition processing on the inputted image to recognize, for example, the road associated object (e.g., the lane marking M1, pole M2, guardrail M3, and curbstone M4 as shown in FIGS. 5A, 5B) that are located at the boundary of the curve ahead of the vehicle or in its vicinity. Subsequently, the image recognition processor 380b obtains a relative position between the road associated object and the vehicle, and outputs information about a type and the relative position of the road associated object to the brake ECU 360.

The navigation system 390 includes the geomagnetic sensor, the gyroscope, the distance sensor, the position detector, the road map data storage, the color display, and the control circuit, which are all known. The position detector includes the GPS receiver for the GPS that detects a position of the vehicle based on radio waves from the GPS satellites, and the like. The road map data storage stores road map data. Liquid crystal or a CRT, for example, is employed in the color display.

The road map data includes link data and node data for expressing roads on a map using the links and nodes, respectively. The link data and node data include information about the coordinates of the starting points and endpoints of the links, the link length, the passing division width, and the curvature radiuses of the roads. The navigation system 390 identifies the present position of the vehicle in response to a command from the brake ECU 360, and outputs the link data and node data on the curve, which exists within the predetermined range ahead of the vehicle.

If the vehicle proceeds into the curve ahead of the vehicle in its traveling direction, or travels along the curve, the brake ECU 360 assistively controls the braking force of the brake system based on input signals from various sensors and switches described above, upon the brake operation by the driver as the vehicle approaches the road associated object. Accordingly, the driver can feel a satisfactory sense of deceleration in avoiding a collision with the road associated object.

In the third embodiment, this assistive control is done using an approaching/separating state evaluation index KdB, which indicates an approaching/separating state between the vehicle and the road associated object. The evaluation index KdB will be described below.

When the curve exists in the traveling direction of the vehicle, the driver determines whether the vehicle is approaching the road associated object or whether it is traveling away from the road associated object, usually from visual area change of the road associated object that exists on the curve, so that he/she regulates the acceleration or deceleration of the vehicle through an accelerator operation or the brake operation, respectively. Accordingly, an index of the visual area change of the road associated object to serve as a criterion for the driver's determination will be calculated as the evaluation index KdB.

A specific method of calculating the evaluation index KdB will be described below. A seeming area (S) of the road associated object is expressed in the following equation (34), given actual height ($H_0$) and width ($W_0$) of the road associated object, an area ($S_0(=H_0 \times W_0)$), height (H) and width (W) of an image of the road associated object, which is projected on (the retina of) the eye of the driver, the area ($S(=W \times H)$), a distance (D) between the road associated object and (the crystalline lens of) the eye of the driver, and the focal length (f) of the eye of the driver.

$$S = W \times H = W_0 \times H_0 \times (f/D)^2 \tag{34}$$

Therefore, a changing rate dS/dt of the seeming area S of the image of the road associated object, which is projected on the retina of the eye of the driver, is expressed in the following equation (35).

$$dS/dt = d(W \times H)/dt \propto d(f/D)^2/dt \propto d(1/D^2)/dt \tag{35}$$

By partially differentiating the above equation (35) with respect to the distance D, the changing rate dS/dt (i.e., a changing rate K) is expressed in the following equation (36).

$$dS/dt \propto d(1/D^2)/dt = \{d(1/D^2)/dD\} \times (dD/dt) = (-2/D^3) \times V_r = K \tag{36}$$

In this manner, the changing rate K of the area of the road associated object is calculated using the distance D between the road associated object and the vehicle, and the relative speed $V_r$, which is a changing rate of the distance D.

In addition, since the changing rate K expresses the changing rate dS/dt of the seeming area S of the road associated object, the changing rate K equals a changing rate (per unit time) of a size of the road associated object in the image taken by the CCD camera 380a. Thus, the changing rate K may be calculated from the changing rate of the size of the road associated object in the image.

The changing rate K varies considerably, for example, on the order of $10^6$ with the distance D in the range of 1 to 100 [m]. Accordingly, the changing rate K is expressed in decibel [dB].

As regards the expression in decibel, when the vehicle approaches the road associated object that exists 100 [m] ahead of the vehicle with the relative speed $V_r = -0.1$ [km/h], a changing rate $K_0$ of the area of the road associated object is assumed to be minimum area change that the driver can possibly realize, and is defined as 0 [dB]. The changing rate $K_0$ is expressed in the following equation (37).

$$K_0 = (-2/D^3) \times V_r = (-2/100^3) \times (-0.1/3.6) \approx 5 \times 10^{-8} \tag{37}$$

That is, a decibel value when the changing rate $K_0$ is $5 \times 10^{-8}$ is defined as 0 [dB], and an index expressed in the following equation (38) is defined as the evaluation index KdB. Additionally, the evaluation index KdB is larger than 0

(zero) when the vehicle approaches the road associated object, and is smaller than 0 (zero) when the vehicle travels away from the road associated object.

$$KdB = 10 \times \log(|K/(5 \times 10^{-8})|) = 10 \times \log\{|-2 \times V_r|/(D^3 \times 5 \times 10^{-8})\} \quad (38)$$

Figure 14:
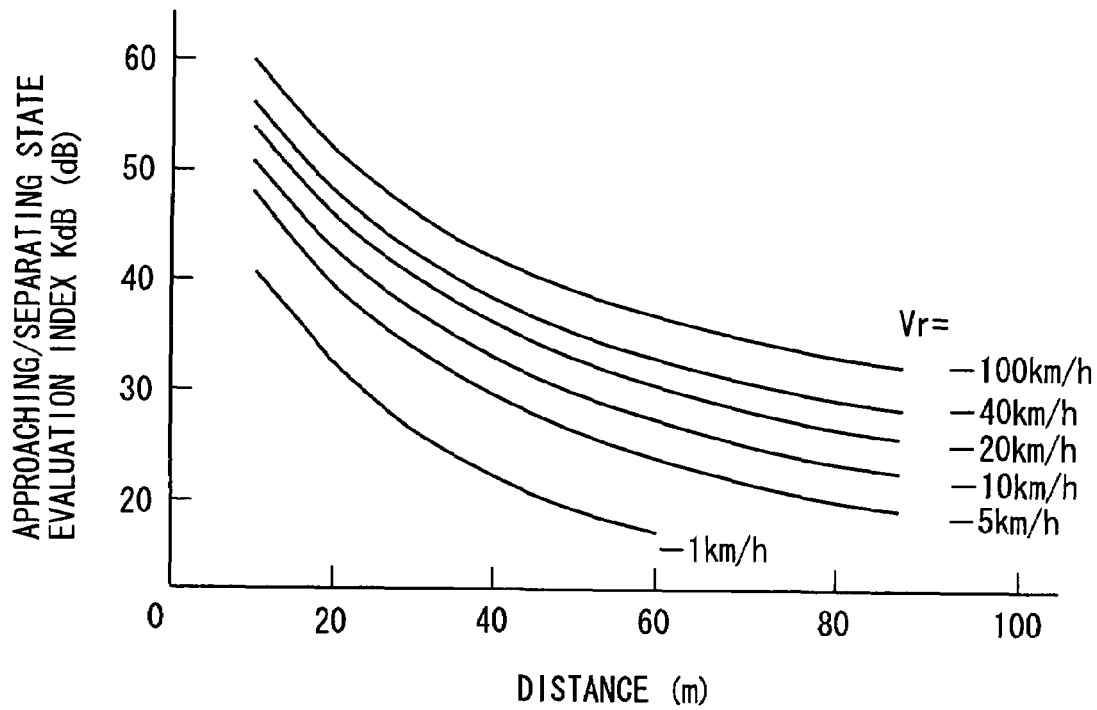
FIG. 14 is a diagram showing a variation characteristic of an approaching/separating state evaluation index.

FIG. 14 shows how the evaluation index KdB, which is defined by the above equation (38), varies according to the relative speed $V_r$ and the distance D to the road associated object. As can be seen from FIG. 14, when the vehicle approaches the road associated object and the relative speed $V_r$ increases, the evaluation index KdB increases, and for each relative speed $V_r$, when the distance D decreases, the evaluation index KdB increases at a steeper slope.

Next, the assistive control of the braking force by the brake ECU 360 will be described with reference to a flowchart in FIG. 15. This assistive control is done when the vehicle proceeds into the curve ahead of the vehicle in its traveling direction, or travels along the curve. It is determined based on output signals from the image recognition processor 380b and the navigation system 390 whether the vehicle proceeds into the curve ahead of the vehicle in its traveling direction, or whether the vehicle travels along the curve.

At step 200 (S200), the brake ECU 360 takes in the input signals from various sensors and switches 310 to 350. At step 210 (S210), it is determined whether a detection signal of the brake SW 330 has changed from OFF to ON. In other words, it is determined whether the driver has started the brake operation at S210.

If it is determined that the detection signal of the brake SW 330 has changed to ON at S210, control proceeds to step 220 (S220) to calculate a present value KdB_p of the evaluation index KdB. More specifically, by substituting the distance D to the road associated object detected by the radar 310 and the relative speed $V_r$, which is the changing rate of the distance D, for the above equation (38), the present approaching/separating state evaluation index KdB_p is calculated.

Figure 16:
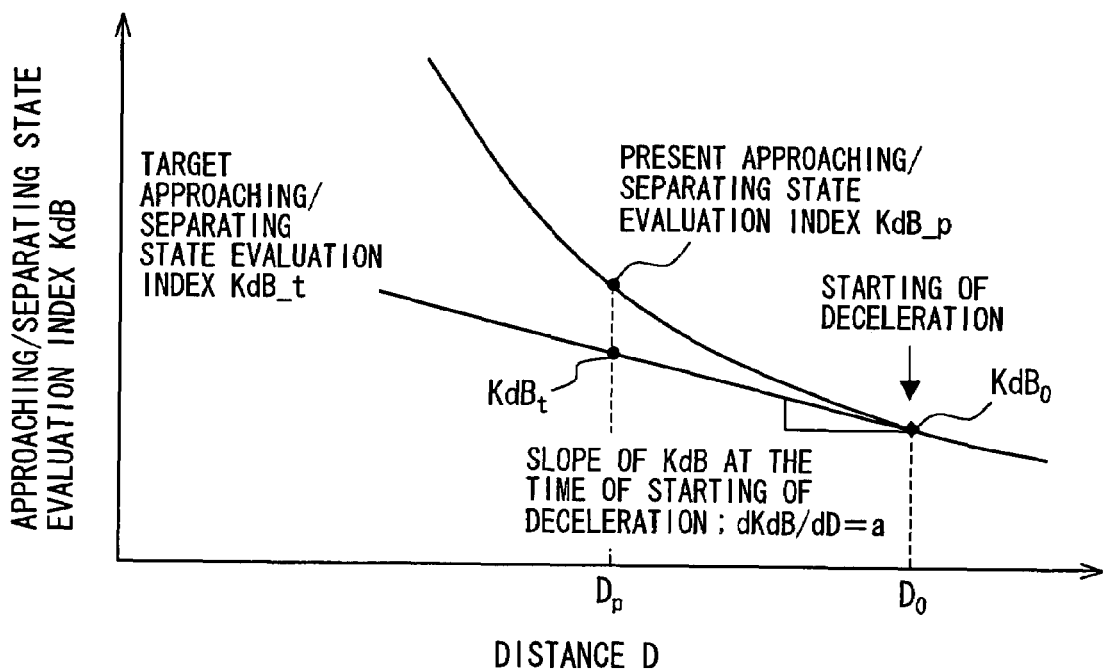
FIG. 16 is an illustrative diagram illustrating a method of calculating a target approaching/separating state evaluation index.

At step 230 (S230), a target value KdB_t of the evaluation index KdB is calculated. With reference to FIG. 16, a method of calculating the target approaching/separating state evaluation index KdB_t will be described below. First, an initial value $KdB_0$ is set to the present evaluation index KdB_p obtained at S220. As well, by differentiating the present evaluation index KdB_p with respect to the distance D, a slope S of the evaluation index KdB at the time of starting the deceleration of the vehicle through the brake operation is obtained.

As expressed in the following equation (39), the target evaluation index KdB_t is calculated using the initial value $KdB_0$, the slope S, a distance $D_0$ at the time of starting the deceleration, gain that varies with an operation signal through the brake SW 330, and a present value $D_p$ of the distance to the road associated object.

$$KdB\_t = gain \times S \times D_p + (S \times D_0 + KdB_0) \quad (39)$$

As shown in FIG. 16, when the present distance $D_p$ to the road associated object decreases, the target evaluation index KdB_t increases linearly from the initial value $KdB_0$ at the constant slope S of the approaching/separating state evaluation index KdB at the time of starting the deceleration through the brake operation. Lastly, by substituting the present distance $D_p$ to the road associated object for the equation (39) for calculation of the target evaluation index KdB_t, the target evaluation index KdB_t with the distance D being the present distance $D_p$ is calculated.

In addition, the gain that varies with the operation signal through the brake SW 330 may take the value of, for example, 0.9, 1.0, or 1.1. In the case of 'gain=1.0', the slope S is not modified. In the case of 'gain=0.9', however, the slope S is modified to a smaller value. Hence, when the distance D to the road associated object decreases, the relative speed $V_r$ with the vehicle approaching the road associated object decreases more rapidly, thereby strengthening the degree of deceleration of the vehicle. On the other hand, in the case of 'gain=1.1', the slope S is modified to a larger value, thereby lessening the degree of deceleration. In this manner, when the braking force of the vehicle is assistively controlled, the degree of deceleration through the assistive control can be regulated according to the driver's preference by multiplying the slope S by the gain indicated by the driver.

At step 240 (S240), the target relative speed $V_{r\_t}$ is calculated by the following equation (40) using the target evaluation index KdB_t calculated at S230.

$$V_{r\_t} = -\frac{1}{2} \times 10^{(KdB\_t/10)} \times D^3 \times 5 \times 10^{-8} \quad (40)$$

That is, a approaching/separating state evaluation index curve, which passes through the target evaluation index KdB_t with the distance D being the present distance $D_p$ (FIG. 16), is assumed. Then, a relative speed is obtained from the assumed curve as the target relative speed $V_{r\_t}$.

At step 250 (S250), by differentiating the present distance $D_p$, a target relative deceleration $dV_r/d_{t\_t}$ is calculated by the following equation (41) using a present relative speed $V_{r\_p}$ between the vehicle and the road associated object and the target relative speed $V_{r\_t}$.

$$dV_r/d_{t\_t} = (V_{r\_p} - V_{r\_t})/\Delta t \quad (41)$$

Additionally, $\Delta t$ is a divisor to convert a difference between the present relative speed $V_{r\_p}$ and the target relative speed $V_{r\_t}$ into the target relative deceleration $dV_r/d_{t\_t}$, and is appropriately set.

At step 260 (S260), it is determined whether a collision time allowance TTC that expresses a time allowance before the vehicle collides with the road associated object is shorter than a predetermined amount of time Tref. If it is determined that the collision time allowance TTC is shorter than the predetermined amount of time Tref (TTC<Tref) at S260, control proceeds to step 270 (S270), whereas control proceeds to step 300 (S300) if it is determined that the collision time allowance TTC is equal to or longer than the predetermined amount of time Tref (TTC≧Tref).

In addition, if it is determined that the collision time allowance TTC is equal to or longer than the predetermined amount of time Tref (TTC≧Tref), there is an enough collision time allowance TTC at the time of the starting of the brake operation by the driver. Accordingly, it is considered that the collision with the road associated object can be readily avoided through the driver's own brake operation and the like. Thus, the assistive control of the braking force by the present vehicle brake control system is not carried out at S300.

At S270, a deceleration $dV_r/d_{t\_}d_r$ generated in the vehicle is estimated based on the brake pressure that is generated through the brake operation by the driver. Then, at step 280 (S280), it is determined whether the estimated deceleration $dV_r/d_{t\_}d_r$ is larger than the target relative deceleration $dV_r/d_{t\_t}$. In addition, the decelerations are indicated with minus signs (−), and thus if "the estimated deceleration $dV_r/d_{t\_}d_r$ is larger than the target relative deceleration $dV_r/d_{t\_t}$", a sufficient degree of deceleration is not generated through the brake operation by the driver, so that the vehicle cannot be decelerated with the target relative deceleration $dV_r/d_{t\_t}$.

Accordingly, if it is determined that the estimated deceleration $dV_r/d_{t\_}d_r$ is larger than the target relative deceleration $dV_r/d_{t\_t}$ (YES) at S280, control proceeds to step 290 (S290)

to carry out the assistive control of the braking force. That is, the assistive control is carried out when the collision time allowance TTC before the vehicle collides with the road associated object is shorter than the predetermined amount of time Tref, and the vehicle cannot be decelerated with the target relative deceleration $dV_r/d_{t\_t}$ through the brake operation by the driver.

The assistive control of the braking force at S290 may be carried out as follows. That is, the brake pressure to generate the target relative deceleration $dV_r/d_{t\_t}$ calculated at S250 is obtained from a prepared map, and the brake actuator 370 is controlled to generate this brake pressure. Alternatively, an actual deceleration of the vehicle is detected, and the brake actuator 370 regulates the brake pressure, such that this actual deceleration reaches the target relative deceleration $dV_r/d_{t\_t}$.

On the other hand, if it is determined that the estimated deceleration $dV_r/d_{t\_d_r}$, which corresponds to the brake operation by the driver, is smaller than the target relative deceleration $dV_r/d_{t\_t}$ (NO) at S280, the vehicle can be decelerated with a more rapid deceleration than the target relative deceleration $dV_r/d_{t\_t}$ through the brake operation by the driver. Accordingly, it is considered that the sufficient degree of deceleration is generated through the brake operation by the driver, and thus the assistive control by the present vehicle brake control system does not need to be carried out. As a result, control proceeds to S300 not to carry out the assistive control of the braking force.

At step 310 (S310), it is determined whether a condition for termination of the assistive control is met. This condition may be met, for example, when the vehicle is stopped, the collision time allowance TTC is longer than the predetermined amount of time Tref, or the evaluation index KdB is smaller than the target evaluation index KdB_t, by a designated value or more. If the condition is not met, the processing is repeatedly executed from S200.

The vehicle brake control system of the third embodiment carries out the above assistive control. As described above, when the distance D to the road associated object decreases, the evaluation index KdB increases at a steeper slope if the relative speed $V_r$ is constant (FIG. 14). Therefore, by calculating the target evaluation index KdB_t, the vehicle can be decelerated such that a degree of reduction in the relative speed $V_r$ between the vehicle and the road associated object increases when the vehicle approaches the road associated object. This is because the target evaluation index KdB_t increases linearly at the constant slope when the distance D decreases (FIG. 16).

Consequently, the driver can feel a satisfactory sense of deceleration. In actual fact, it is verified through an experiment that when a driver, who is skilled at his/her drive operation of a vehicle, decelerates the vehicle before a curve of a road, the driver performs the brake operation to nearly maintain the slope of the evaluation index KdB at the time of the starting of the brake operation.

In addition, the constant slope S that is used for calculating the target evaluation index KdB_t varies according to the distance $D_0$ to the road associated object at the time of the starting of the brake operation by the driver. Thus, the target evaluation index KdB_t, which is appropriate for the distance D to the road associated object and the relative speed $V_r$ between the vehicle and the road associated object, is set, thereby decelerating the vehicle to avoid the collision with the road associated object.

Fifth Modification

Figure 15:
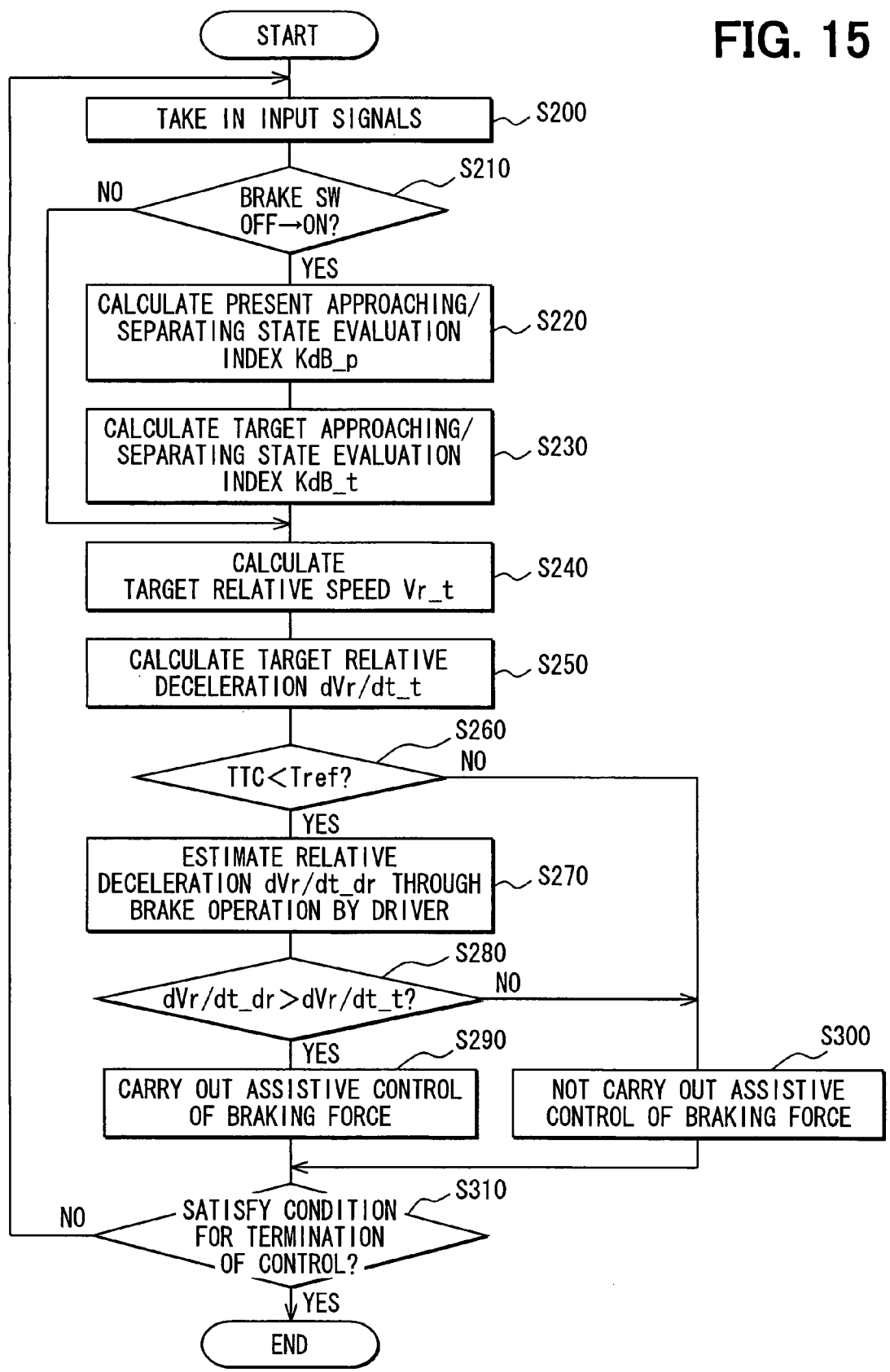
FIG. 15 is a flowchart showing assistive control of braking force.

In the third embodiment, if it is determined that the detection signal of the brake SW 330 has changed to ON at S210 in FIG. 15, that is, when the driver has started the brake operation, the present value KdB_p of the evaluation index KdB is calculated at S220. In addition to the brake operation whereby the brake pedal is depressed by the driver, an accelerator-off operation whereby a depression of an accelerator pedal is reduced or a shifting operation whereby a shift position of the vehicle is changed to generate engine braking, for example, may be employed for the drive operation by the driver to decelerate the vehicle.

Thus, at S210 in FIG. 15, the starting of the drive operation to decelerate the vehicle may be determined from whether the accelerator-off operation or shifting operation, in addition to the brake operation, has started. In such a case, the vehicle deceleration generated in the vehicle through the accelerator-off operation or shifting operation may be estimated based on the vehicle speed or the shift position (i.e., a reduction ratio of a transmission), respectively at S270 in FIG. 15.

Fourth Embodiment

Because a fourth embodiment and the third embodiment have a number of common features, a detailed explanation as to the common features will be omitted, and the explanation will be given with emphasis on different features. In the third embodiment, when the vehicle proceeds into the curve ahead of the vehicle in its traveling direction or travels along the curve, the target value of the approaching/separating state evaluation index is set at the time of the starting of the brake operation by the driver. Based on the target relative speed that corresponds to this target value of the evaluation index and the actual relative speed, the target vehicle deceleration is calculated and the assistive control of the braking force is carried out, such that the vehicle deceleration reaches the target vehicle deceleration.

Figure 17:
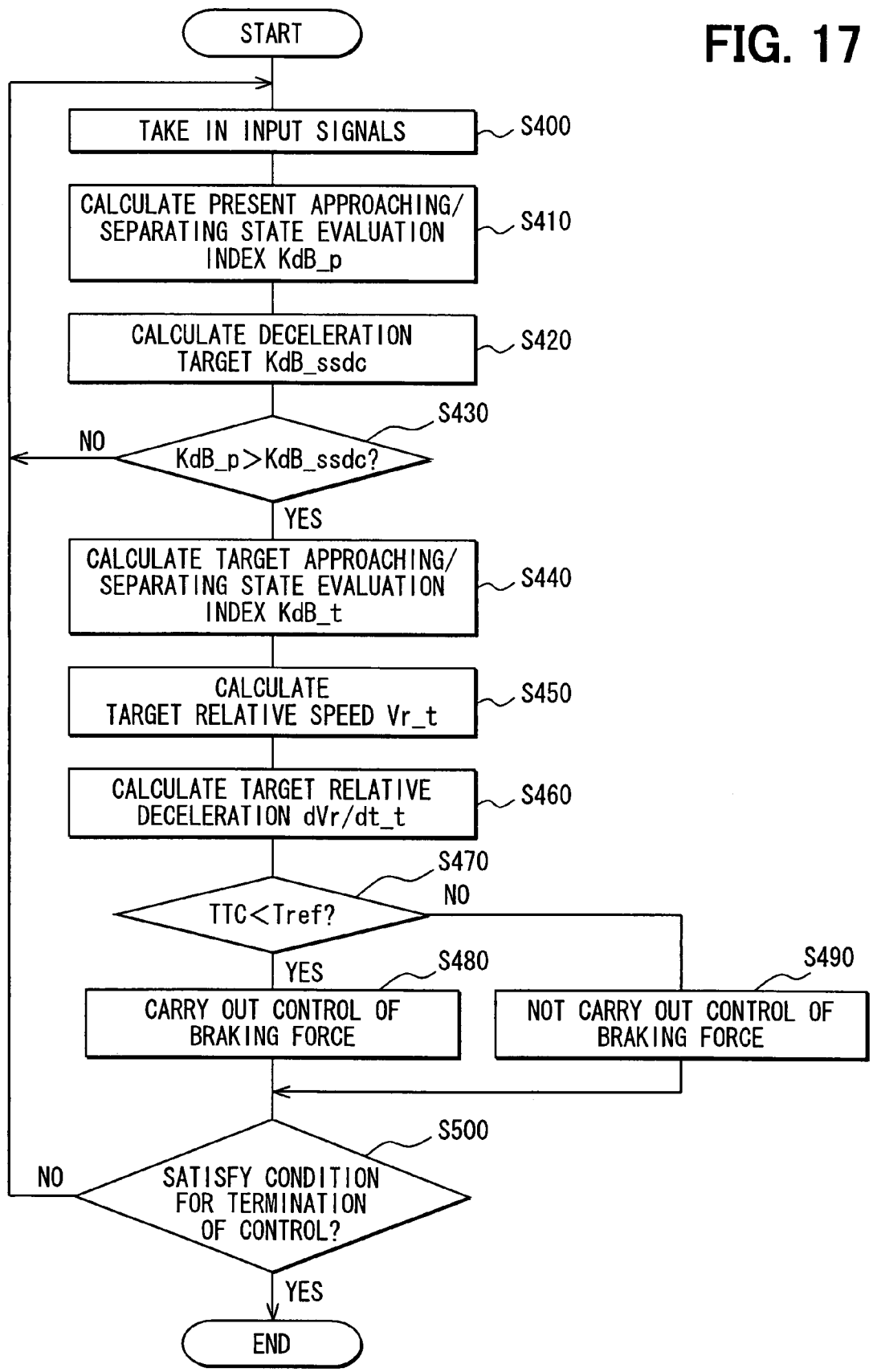
FIG. 17 is a flowchart showing control of the braking force according to a fourth embodiment of the present invention.

On the other hand, the fourth embodiment is different from the third embodiment in that, when the vehicle proceeds into the curve ahead of the vehicle in its traveling direction or travels along the curve, a deceleration target that expresses a index of a timing, with which the control of the braking force of the brake system is carried out, is calculated from a normal vehicle deceleration, the distance to the road associated object, and the actual relative speed. The target value of the evaluation index is set at the time it is determined that the present value of the evaluation index is larger than the deceleration target. With reference to a flowchart in FIG. 17, the control of the braking force according to the fourth embodiment, which is carried out by the brake ECU 360, will be described below. This control of the braking force is carried out when the vehicle proceeds into the curve ahead of the vehicle in its traveling direction or travels along the curve. Based on the output signals from the image recognition processor 380b and the navigation system 390, it is determined whether the vehicle proceeds into the curve or whether the vehicle travels along the curve.

At step 400 (S400), the brake ECU 360 takes in the input signals from various sensors and switches 310 to 350. The present value KdB_p of the evaluation index KdB is calculated at step 410 (S410). More specifically, by substituting the distance D to the road associated object detected by the radar 310 and the relative speed $V_r$, which is the changing rate of the distance D, for the above equation (38), the present evaluation index KdB_p is calculated.

At step 420 (S420), a deceleration target $KdB_{\_ssdc}$ that expresses an index of a timing, with which the control of the braking force of the brake system is carried out, is calculated from a normal vehicle deceleration Nd, the distance D to the road associated object, and the relative speed $V_r$. The deceleration target KdB$_{\_ssdc}$ is obtained in the following manner. First, the equation (38) is transformed into the following equation (42).

$$10^{(|KdB|/10)} = |-2 \times V_r|/(D^3 \times 5 \times 10^{-8}) \quad (42)$$

$$|-V_r| = (D^3 \times 5 \times 10^{-8}/2) \times 10^{(|KdB|/10)} = 2.5 \times D^3 \times 10^{\{(|KDB|/10)-8\}} \quad (43)$$

By differentiating the above equation (43), the following equation (44) is obtained.

$$(dV_r/dD) \times (dD/dt) = 7.5 \times D^2 \times 10^{\{(|KdB|/10)-8\}} \times V_r \quad (44)$$

Since the above equation (44) expresses a deceleration, the normal vehicle deceleration Nd (e.g., a normal deceleration generated in the vehicle through the drive operation by the driver to decelerate the vehicle) and the corresponding deceleration target KdB$_{\_ssdc}$ are expressed in the following equation (45).

$$Nd = 7.5 \times D^2 \times 10^{\{(|KdB\_ssdc|/10)-8\}} \times V_r \quad (45)$$

The above equation (45) is transformed into the following equation (46).

$$10^{\{(|KdB\_ssdc|/10)-8\}} = Nd/7.5 \times D^2 \times Vr \quad (46)$$

By transforming the above equation (46), the deceleration target KdB$_{\_ssdc}$ is expressed in logarithm in the following equation (47).

$$KdB\_ssdc = \{\log(|Nd/(7.5 \times D^2 \times V_r)|) + 8\} \times 10 \quad (47)$$

In the above equation (47), as described above, the normal vehicle deceleration Nd is defined as a normal deceleration generated in the vehicle through the drive operation by the driver to decelerate the vehicle. Alternatively, the normal vehicle deceleration Nd may be defined as a deceleration generated in the vehicle by the engine braking.

At step 430 (S430), it is determined whether the present evaluation index KdB_p is larger than the deceleration target KdB$_{\_ssdc}$. If it is determined that the present evaluation index KdB_p is larger than the deceleration target KdB$_{\_ssdc}$ (YES), the control of the braking force is considered to be started, and control proceeds to step 440 (S440). On the other hand, if it is determined that the present evaluation index KdB_p is not larger than the deceleration target KdB$_{\_ssdc}$ (NO), control proceeds to S400 and the above processing is repeatedly executed.

In this manner, the deceleration target KdB$_{\_ssdc}$ is calculated based on the normal vehicle deceleration Nd, and the control of the braking force of the brake system is started at the time the present evaluation index KdB_p becomes larger than the deceleration target KdB$_{\_ssdc}$. Accordingly, when the vehicle approaches the road associated object, the control of the braking force of the brake system can be started with a timing, with which the driver normally starts the drive operation to decelerate the vehicle even if the driver does not start the drive operation to decelerate the vehicle.

At S440, the target value KdB_t of the evaluation index KdB is calculated. The method of calculating the target evaluation index KdB_t has been described in the third embodiment with reference to FIG. 16. The target evaluation index KdB_t, which increases linearly at the constant slope when the distance to the road associated object decreases, is set at S440. Consequently, the vehicle can be decelerated such that the degree of reduction in the relative speed between the vehicle and the road associated object increases when the vehicle approaches the road associated object. As a result, the driver can feel a satisfactory sense of deceleration.

At step 450 (S450), the target relative speed V$_{r\_t}$ is calculated by the following equation (48) using the target evaluation index KdB_t, which is calculated at S440.

$$V_{r\_t} = -\frac{1}{2} \times 10^{(KdB\_t/10)} \times D^3 \times 5 \times 10^{-8} \quad (48)$$

That is, the approaching/separating state evaluation index curve, which passes through the target evaluation index KdB_t with the distance D being the present distance D$_p$ to the road associated object (FIG. 16), is assumed. Then, a relative speed is obtained from the assumed curve as the target relative speed V$_{r\_t}$.

At step 460 (S460), by differentiating the present distance D$_p$, the target relative deceleration dV$_r$/d$_{t\_t}$ is calculated by the following equation (49) using the present relative speed V$_{r\_p}$ between the vehicle and the road associated object and the target relative speed V$_{r\_t}$.

$$dV_r/d_{t\_t} = (V_{r\_p} - V_{r\_t})/\Delta t \quad (49)$$

Additionally, Δt is a divisor to convert a difference between the present relative speed V$_{r\_p}$ and the target relative speed V$_{r\_t}$ into the target relative deceleration dV$_r$/d$_{t\_t}$, and is appropriately set.

At step 470 (S470), it is determined whether the collision time allowance TTC that expresses a time allowance before the vehicle collides with the road associated object is shorter than the predetermined amount of time Tref. If it is determined that the collision time allowance TTC is shorter than the predetermined amount of time Tref (TTC<Tref) at S470, control proceeds to step 480 (S480), whereas control proceeds to step 490 (S490) if it is determined that the collision time allowance TTC is equal to or longer than the predetermined amount of time Tref (TTC≧Tref).

In addition, if it is determined that the collision time allowance TTC is equal to or longer than the predetermined amount of time Tref (TTC≧Tref), there is an enough collision time allowance TTC at the time it is determined that the present evaluation index KdB_p is larger than the deceleration target KdB$_{\_ssdc}$. Accordingly, it is considered that the collision with the road associated object can be readily avoided through the driver's own drive operation. Thus, the control of the braking force by the present vehicle brake control system is not carried out at S490.

At S480, the control of the braking force is carried out. That is, the control of the braking force is carried out when the collision time allowance TTC before the vehicle collides with the road associated object is shorter than the predetermined amount of time Tref, and the vehicle cannot be decelerated with the target relative deceleration dV$_r$/d$_{t\_t}$ through the driver's own drive operation.

The control of the braking force at S480 may be carried out as follows. That is, the brake pressure to generate the target relative deceleration dV$_r$/d$_{t\_t}$ calculated at S460 is obtained from a prepared map, and the brake actuator 370 is controlled to generate this brake pressure. Alternatively, the actual deceleration of the vehicle is detected, and the brake actuator 370 regulates the brake pressure, such that this actual deceleration reaches the target relative deceleration dV$_r$/d$_{t\_t}$.

At step 500 (S500), it is determined whether a condition for termination of the control of the braking force is met. This condition may be met, for example, when the vehicle is stopped, or the present evaluation index KdB_p is smaller than the target evaluation index KdB_t by a designated value or more. If the condition is not met, the processing is repeatedly executed from S400.

The vehicle brake control system according to the fourth embodiment calculates the deceleration target based on the normal vehicle deceleration, and starts the control of the braking force of the brake system at the time the approaching/separating state evaluation index becomes larger than the deceleration target. Accordingly, when the vehicle proceeds into the curve or travels along the curve, the control of the braking force of the brake system can be started with a timing, with which the driver normally starts the drive operation to decelerate the vehicle even if the driver does not start the drive operation to decelerate the vehicle. As a result, the driver can be assisted with his/her drive operation of the vehicle in a comprehensive manner when the vehicle travels along the curve.

When the control of the braking force of the brake system is started, the target approaching/separating state evaluation index, which increases linearly at the constant slope when the distance to the road associated object decreases, is set. When the distance to the road associated object decreases, the approaching/separating state evaluation index increases at a steeper slope if the relative speed is constant. Thus, by setting the target approaching/separating state evaluation index, which increases linearly at the constant slope when the distance to the road associated object decreases, the vehicle can be decelerated such that the degree of reduction in the relative speed between the vehicle and the road associated object increases when the vehicle approaches the road associated object.

In addition, the constant slope that is used for calculating the target approaching/separating state evaluation index varies according to the distance to the road associated object at the time of the starting of the drive operation to decelerate the vehicle by the driver. Thus, the target approaching/separating state evaluation index, which is appropriate for the distance to the road associated object and the relative speed between the vehicle and the road associated object, can be set.

Additional advantages and modifications will readily occur to those skilled in the art. The invention in its broader terms is therefore not limited to the specific details, representative apparatus, and illustrative examples shown and described.

What is claimed is:

1. A vehicle control system for controlling a vehicle, comprising:
   a distance obtaining means for obtaining a distance between the vehicle and a road associated object on a road, wherein the road associated object is an object located along an extension line of a traveling direction of the vehicle, and at a boundary of a curve of the road or in a vicinity of the boundary, wherein the curve exists ahead of the vehicle;
   an evaluation index calculating means for calculating an approaching/separating state evaluation index that indicates a positional relationship between the vehicle and the road associated object, wherein:
      the approaching/separating state evaluation index increases when a relative speed between the vehicle and the road associated object increases at a time of approaching of the vehicle to the road associated object; and
      the approaching/separating state evaluation index for the relative speed increases at a faster rate as the distance decreases;
   a curvature radius obtaining means for obtaining a curvature radius of the curve;
   a target vehicle speed setting means for setting a target vehicle speed of the vehicle, with which the vehicle travels along the curve, based on the curvature radius of the curve;
   a vehicle speed obtaining means for obtaining a current speed of the vehicle;
   a target vehicle deceleration calculating means for calculating a target vehicle deceleration, with which the vehicle is controlled to travel so that the vehicle travels along the curve with the target vehicle speed, based on the approaching/separating state evaluation index, the distance, the current speed of the vehicle, and the target vehicle speed; and
   a vehicle control means for controlling the vehicle to decelerate such that a deceleration of the vehicle coincides with the target vehicle deceleration, when the current speed of the vehicle is larger than the target vehicle speed.

2. The vehicle control system according to claim 1, wherein the vehicle control means controls the vehicle to maintain the current speed of the vehicle when a difference between the current speed of the vehicle and the target vehicle speed is smaller than a predetermined value.

3. The vehicle control system according to claim 1, wherein:
   the target vehicle deceleration calculating means calculates a target vehicle acceleration in addition to the target vehicle deceleration, wherein the vehicle is controlled to travel with the target vehicle acceleration by the vehicle control means so that the vehicle travels along the curve with the target vehicle speed; and
   the vehicle control means controls the vehicle to accelerate such that an acceleration of the vehicle coincides with the target vehicle acceleration, when the current speed of the vehicle is smaller than the target vehicle speed.

4. The vehicle control system according to claim 1, wherein the evaluation index calculating means calculates $KdB\_p$, which is a present value of the approaching/separating state evaluation index, using the following equation, given D, which is the distance, and $V_{s0}$, which is the current speed of the vehicle:

$$KdB\_p = 10 \times \log\{|-2 \times V_{s0}|/(D^3 \times 5 \times 10^{-8})\}.$$

5. The vehicle control system according to claim 4, wherein the target vehicle acceleration/deceleration calculating means calculates $dV_{s0}/dt$, which is the target vehicle acceleration or deceleration, using the following equation, given $V_{s0\_t}$, which is the target vehicle speed:

$$dV_{s0}/dt = 7.5 \times D^2 \times 10^{\{(|KdB\_p|/10)-8\}} \times (V_{s0} - V_{s0\_t}).$$

6. The vehicle control system according to claim 5, wherein the target vehicle acceleration/deceleration calculating means calculates a final value of the target vehicle acceleration or deceleration by multiplying the target vehicle acceleration or deceleration, respectively, by gain, which is a positive value and is equal to or smaller than one.

7. The vehicle control system according to claim 1, wherein the distance obtaining means obtains the distance between the vehicle and the road associated object, wherein the road associated object includes at least one of a lane marking, a pole, a guardrail, a curbstone, a reflective plate, and a delineator.

8. The vehicle control system according to claim 1, wherein the distance obtaining means obtains the distance between the vehicle and the road associated object using road map data and a position of the vehicle, which is detected by a global positioning system.

9. A vehicle control system for controlling a vehicle, comprising:
   a distance obtaining means for obtaining a distance between the vehicle and a road associated object on a road, wherein the road associated object is an object located along an extension line of a traveling direction of the vehicle, and at a boundary of a curve of the road or in a vicinity of the boundary, wherein the curve exists ahead of the vehicle;

an evaluation index calculating means for calculating an approaching/separating state evaluation index that indicates a positional relationship between the vehicle and the road associated object, wherein:

the approaching/separating state evaluation index increases when a relative speed between the vehicle and the road associated object increases at a time of approaching of the vehicle to the road associated object; and the approaching/separating state evaluation index for the relative speed increases at a faster rate as the distance decreases;

a curvature radius obtaining means for obtaining a curvature radius of the curve;

a target vehicle speed setting means for setting a target vehicle speed of the vehicle, with which the vehicle travels along the curve, based on the curvature radius of the curve;

a vehicle speed obtaining means for obtaining a current speed of the vehicle;

a target vehicle acceleration/deceleration calculating means for calculating a target vehicle acceleration or deceleration, with which the vehicle is controlled to travel so that the vehicle travels along the curve with the target vehicle speed, based on the approaching/separating state evaluation index, the distance, the current speed of the vehicle, and the target vehicle speed; and a vehicle control means for controlling the vehicle such that an acceleration or deceleration of the vehicle coincides with the target vehicle acceleration or deceleration, respectively, based on a comparison between the current speed of the vehicle and the target vehicle speed.

10. The vehicle control system according to claim 9, wherein:

the vehicle control means controls the vehicle to decelerate such that the deceleration of the vehicle coincides with the target vehicle deceleration when the current speed of the vehicle is larger than the target vehicle speed; and the vehicle control means controls the vehicle to accelerate such that the acceleration of the vehicle coincides with the target vehicle acceleration when the current speed of the vehicle is smaller than the target vehicle speed.

11. The vehicle control system according to claim 9, wherein the vehicle control means controls the vehicle to maintain the current speed of the vehicle when a difference between the current speed of the vehicle and the target vehicle speed is smaller than a predetermined value.

12. The vehicle control system according to claim 9, wherein the evaluation index calculating means calculates KdB_p, which is a present value of the approaching/separating state evaluation index, using the following equation, given D, which is the distance, and $V_{s0}$, which is the current speed of the vehicle:

$$KdB\_p = 10 \times \log\{|-2 \times V_{s0}|/(D^3 \times 5 \times 10^{-8})\}.$$

13. The vehicle control system according to claim 12, wherein the target vehicle acceleration/deceleration calculating means calculates $dV_{s0}/dt$, which is the target vehicle acceleration or deceleration, using the following equation, given $V_{s0\_t}$, which is the target vehicle speed:

$$dV_{s0}/dt = 7.5 \times D^2 \times 10^{\{((KdB-p)/10)-8\}} \times (V_{s0} - V_{s0\_t}).$$

14. The vehicle control system according to claim 13, wherein the target vehicle acceleration/deceleration calculating means calculates a final value of the target vehicle acceleration or deceleration by multiplying the target vehicle acceleration or deceleration, respectively, by gain, which is a positive value and is equal to or smaller than one.

15. The vehicle control system according to claim 9, wherein the distance obtaining means obtains the distance between the vehicle and the road associated object, wherein the road associated object includes at least one of a lane marking, a pole, a guardrail, a curbstone, a reflective plate, and a delineator.

16. The vehicle control system according to claim 9, wherein the distance obtaining means obtains the distance between the vehicle and the road associated object using road map data and a position of the vehicle, which is detected by a global positioning system.

17. A vehicle control system for controlling a vehicle, comprising:

a distance obtaining means for obtaining a distance between the vehicle and an obstruction on a road, wherein the obstruction exists on the road, which is ahead of the vehicle in a traveling direction of the vehicle;

a relative speed obtaining means for obtaining a relative speed between the vehicle and the obstruction;

an evaluation index calculating means for calculating an approaching/separating state evaluation index that indicates a positional relationship between the vehicle and the obstruction, wherein:

the approaching/separating state evaluation index increases when the relative speed increases at a time of approaching of the vehicle to the obstruction; and the approaching/separating state evaluation index for the relative speed increases at a faster rate as the distance decreases;

a turning radius calculating means for calculating a turning radius of the vehicle, which is necessary for the vehicle to avoid a collision with the obstruction, based on the distance;

a target lateral acceleration setting means for setting a target value of a lateral acceleration, which is generated in the vehicle in a lateral direction of the vehicle through a steering operation by a driver of the vehicle to avoid the collision;

a target relative speed calculating means for calculating a target relative speed between the vehicle and the obstruction based on the turning radius and the target value of the lateral acceleration;

a target relative deceleration calculating means for calculating a target relative deceleration between the vehicle and the obstruction based on the distance, the relative speed, and the approaching/separating state evaluation index; and a vehicle control means for controlling the vehicle to decelerate such that a relative deceleration between the vehicle and the obstruction coincides with the target relative deceleration when the relative speed is larger than the target relative speed, wherein the vehicle is controlled to travel with the target relative deceleration by the vehicle control means so that the vehicle is decelerated to the target relative speed.

18. The vehicle control system according to claim 17, wherein the target relative deceleration calculating means calculates a final value of the target relative deceleration by multiplying the target relative deceleration by gain, which is a positive value and is equal to or smaller than one.

19. The vehicle control system according to claim 17, further comprising:
a road surface friction coefficient determining means for determining a friction coefficient between a tire of the vehicle and a surface of the road that is ahead of the vehicle in the traveling direction of the vehicle; and
a maximum deceleration calculating means for calculating a maximum deceleration that is generable in the vehicle based on the friction coefficient, wherein the vehicle control means controls the vehicle such that the relative deceleration is smaller than the maximum deceleration.

20. The vehicle control system according to claim 17, further comprising a vehicle projection plane locus estimating means for estimating a future locus of a projection plane of the vehicle based on a traveling state of the vehicle, wherein:
the projection plane of the vehicle is a plane that has an area of a width and height of the vehicle; and
the future locus of the projection plane is a virtual three-dimensional track left by the projection plane along the road when it is hypothesized that the projection plane travels with a present traveling state of the vehicle maintained, wherein the distance obtaining means obtains the distance between the vehicle and the obstruction, which overlaps with the future locus of the projection plane of the vehicle.

21. The vehicle control system according to claim 20, wherein the vehicle projection plane locus estimating means estimates the future locus of the projection plane of the vehicle in view of a minimum ground clearance of the vehicle.

22. The vehicle control system according to claim 17, wherein the evaluation index calculating means calculates KdB_p, which is a present value of the approaching/separating state evaluation index, using the following equation, given $V_r$, which is the relative speed and D, which is the distance:

$$KdB\_p = 10 \times \log\{|-2 \times V_r|/(D^3 \times 5 \times 10^{-8})\}.$$

23. The vehicle control system according to claim 22, wherein the target relative deceleration calculating means calculates $dV_r/dt$, which is the target relative deceleration, using the following equation, given $V_{r\_t}$, which is the target relative speed:

$$dV_r/dt = 7.5 \times D^2 \times 10^{\{(|KdB\_p|/10)-8\}} \times (V_r - V_{r\_t}).$$

24. A vehicle control system for controlling a vehicle, comprising:
a distance obtaining means for obtaining a distance between the vehicle and one of an obstruction and a road associated object, wherein:
the vehicle travels along a road;
the obstruction exists on a curve of the road, wherein the curve exists ahead of the vehicle in a traveling direction of the vehicle; and
the road associated object is an object located at a boundary of the curve or in a vicinity of the boundary;
an evaluation index calculating means for calculating an approaching/separating state evaluation index that indicates a positional relationship between the vehicle and the one of the obstruction and the road associated object, wherein:
the approaching/separating state evaluation index increases when a relative speed between the vehicle and the one of the obstruction and the road associated object increases at a time of approaching of the vehicle to the one of the obstruction and the road associated object; and
the approaching/separating state evaluation index for the relative speed increases at a faster rate as the distance decreases;
a curvature radius obtaining means for obtaining a curvature radius of the curve;
a target vehicle speed setting means for setting a target vehicle speed of the vehicle, with which the vehicle travels along the curve, based on the curvature radius of the curve;
a vehicle speed obtaining means for obtaining a current speed of the vehicle;
a relative speed obtaining means for obtaining the relative speed between the vehicle and the obstruction;
a turning radius calculating means for calculating a turning radius of the vehicle, which is necessary for the vehicle to avoid a collision with the obstruction, based on the distance between the vehicle and the obstruction;
a target lateral acceleration setting means for setting a target value of a lateral acceleration, which is generated in the vehicle in a lateral direction of the vehicle through a steering operation by a driver of the vehicle to avoid the collision;
a target relative speed calculating means for calculating a target relative speed between the vehicle and the obstruction based on the turning radius and the target value of the lateral acceleration;
a target vehicle acceleration/deceleration calculating means for calculating a target vehicle acceleration or deceleration, with which the vehicle is controlled to travel so that the vehicle travels along the curve with the target vehicle speed, based on the approaching/separating state evaluation index between the vehicle and the road associated object, the distance between the vehicle and the road associated object, the current speed of the vehicle, and the target vehicle speed;
a target relative deceleration calculating means for calculating a target relative deceleration between the vehicle and the obstruction based on the distance between the vehicle and the obstruction, the relative speed, and the approaching/separating state evaluation index between the vehicle and the obstruction; and
a vehicle control means for controlling the vehicle to decelerate such that a relative deceleration between the vehicle and the obstruction coincides with the target relative deceleration when the obstruction exists on the curve and the relative speed is larger than the target relative speed, wherein the vehicle is controlled to travel with the target relative deceleration by the vehicle control means so that the vehicle is decelerated to the target relative speed, and controlling the vehicle such that an acceleration or deceleration of the vehicle coincides with the target vehicle acceleration or deceleration, respectively, based on a comparison between the current speed of the vehicle and the target vehicle speed when the obstruction does not exist on the curve.

25. The vehicle control system according to claim 24, wherein the vehicle control means controls the vehicle to decelerate such that the deceleration of the vehicle coincides with the target vehicle deceleration when the current speed of the vehicle is larger than the target vehicle speed, and controls the vehicle to accelerate such that the acceleration of the vehicle coincides with the target vehicle acceleration when the current speed of the vehicle is smaller than the target vehicle speed.

26. The vehicle control system according to claim 24, wherein the vehicle control means controls the vehicle to maintain the current speed of the vehicle when a difference between the current speed of the vehicle and the target vehicle speed is smaller than a predetermined value.

27. The vehicle control system according to claim 24, wherein the evaluation index calculating means calculates KdB_p, which is a present value of the approaching/separating state evaluation index between the vehicle and the road associated object, using the following equation, given $V_{s0}$, which is the current speed of the vehicle, and D, which is the distance between the vehicle and the road associated object:

$$KdB\_p = 10 \times \log\{|-2 \times V_{s0}|/(D^3 \times 5 \times 10^{-8})\}.$$

28. The vehicle control system according to claim 27, wherein the target vehicle acceleration/deceleration calculating means calculates $dV_{s0}/dt$, which is the target vehicle acceleration or deceleration, using the following equation, given $V_{s0\_t}$, which is the target vehicle speed:

$$dV_{s0}/dt = 7.5 \times D^2 \times 10^{\{(|KdB\_p|/10)-8\}} \times (V_{s0} - V_{s0\_t}).$$

29. The vehicle control system according to claim 28, wherein the target vehicle acceleration/deceleration calculating means calculates a final value of the target vehicle acceleration or deceleration by multiplying the target vehicle acceleration or deceleration by gain, which is a positive value and is equal to or smaller than one.

30. The vehicle control system according to claim 24, wherein the distance obtaining means obtains the distance between the vehicle and the road associated object, wherein the road associated object includes at least one of a lane marking, a pole, a guardrail, a curbstone, a reflective plate, and a delineator.

31. The vehicle control system according to claim 24, wherein the distance obtaining means obtains the distance between the vehicle and the road associated object using road map data and a position of the vehicle, which is detected by a global positioning system.

32. The vehicle control system according to claim 24, wherein the target relative deceleration calculating means calculates a final value of the target relative deceleration by multiplying the target relative deceleration by gain, which is a positive value and is equal to or smaller than one.

33. The vehicle control system according to claim 24, further comprising:
a road surface friction coefficient determining means for determining a friction coefficient between a tire of the vehicle and a surface of the road that is ahead of the vehicle in the traveling direction of the vehicle; and
a maximum deceleration calculating means for calculating a maximum deceleration that is generable in the vehicle based on the friction coefficient, wherein the vehicle control means controls the vehicle such that the relative deceleration between the vehicle and the obstruction is smaller than the maximum deceleration.

34. The vehicle control system according to claim 24, further comprising a vehicle projection plane locus estimating means for estimating a future locus of a projection plane of the vehicle based on a traveling state of the vehicle, wherein:
the projection plane of the vehicle is a plane that has an area of a width and height of the vehicle; and
the future locus of the projection plane is a virtual three-dimensional track left by the projection plane along the road when it is hypothesized that the projection plane travels with a present traveling state of the vehicle maintained, wherein the distance obtaining means obtains the distance between the vehicle and the obstruction, which overlaps with the future locus of the projection plane of the vehicle.

35. The vehicle control system according to claim 34, wherein the vehicle projection plane locus estimating means estimates the future locus of the projection plane of the vehicle in view of a minimum ground clearance of the vehicle.

36. The vehicle control system according to claim 24, wherein the evaluation index calculating means calculates KdB_p, which is a present value of the approaching/separating state evaluation index between the vehicle and the obstruction, using the following equation, given $V_r$, which is the relative speed between the vehicle and the obstruction, and D, which is the distance between the vehicle and the obstruction:

$$KdB\_p = 10 \times \log\{|-2 \times V_r|/(D^3 \times 5 \times 10^{-8})\}.$$

37. The vehicle control system according to claim 36, wherein the target relative deceleration calculating means calculates $dV_r/dt$, which is the target relative deceleration, using the following equation, given $V_{r\_t}$, which is the target relative speed:

$$dV_r/dt = 7.5 \times D^2 \times 10^{\{(|KdB\_p|/10)-8\}} \times (V_r - V_{r\_t}).$$

38. A vehicle control system for controlling a vehicle, comprising:
a distance obtaining means for obtaining a distance between the vehicle and a road associated object on a road, wherein the road associated object is an object located along an extension line of a traveling direction of the vehicle, and at a boundary of a curve of the road or in a vicinity of the boundary, wherein the curve exists ahead of the vehicle;
a relative speed detecting means for detecting a relative speed between the vehicle and the road associated object;
an evaluation index calculating means for calculating an approaching/separating state evaluation index that indicates a positional relationship between the vehicle and the road associated object, wherein:
the approaching/separating state evaluation index increases when the relative speed increases, at a time of approaching of the vehicle to the road associated object; and
the approaching/separating state evaluation index for the relative speed increases at a faster rate as the distance decreases;
a deceleration target calculating means for calculating a deceleration target based on a normal deceleration of the vehicle, the distance, and the relative speed, wherein the deceleration target indicates an index of a timing, with which braking force applied through a brake system of the vehicle when the vehicle proceeds into the curve or travels along the curve is controlled;
a deceleration target determining means for determining whether the approaching/separating state evaluation index is larger than the deceleration target;
a target value setting means for setting a target value of the approaching/separating state evaluation index, such that the target value of the approaching/separating state evaluation index increases linearly from an initial value at a constant slope when the distance decreases, wherein:
the initial value is the approaching/separating state evaluation index at a time when the deceleration target determining means determines that the approaching/separating state evaluation index is larger than the deceleration target; and the constant slope is a slope of the approaching/separating state evaluation index at the time when the deceleration target determining means determines that the approaching/separating state evaluation index is larger than the deceleration target;

a target vehicle deceleration calculating means for calculating a target vehicle deceleration based on a target relative speed between the vehicle and the road associated object, and a present relative speed between the vehicle and the road associated object, wherein the target relative speed is obtained based on the target value of the approaching/separating state evaluation index; and a braking force control means for controlling the braking force applied through the brake system such that a deceleration of the vehicle coincides with the target vehicle deceleration when the vehicle proceeds into the curve or travels along the curve.

39. The vehicle control system according to claim 38, further comprising a collision time allowance calculating means for calculating a collision time allowance that indicates a time allowance before the vehicle collides with the road associated object, wherein the braking force control means does not control the braking force when the collision time allowance is equal to or longer than a predetermined amount of time.

40. The vehicle control system according to claim 38, wherein the target value setting means multiplies the slope of the approaching/separating state evaluation index by gain, which is determined by a driver of the vehicle, and sets the target value of the approaching/separating state evaluation index using the slope multiplied by the gain.

41. A vehicle control system for controlling a vehicle, comprising:

a distance obtaining means for obtaining a distance between the vehicle and a road associated object on a road, wherein the road associated object is an object located along an extension line of a traveling direction of the vehicle, and at a boundary of a curve of the road or in a vicinity of the boundary, wherein the curve exists ahead of the vehicle;

a relative speed detecting means for detecting a relative speed between the vehicle and the road associated object;

an evaluation index calculating means for calculating an approaching/separating state evaluation index that indicates a positional relationship between the vehicle and the road associated object, wherein:

the approaching/separating state evaluation index increases when the relative speed increases at a time of approaching of the vehicle to the road associated object; and the approaching/separating state evaluation index for the relative speed increases at a faster rate as the distance decreases;

a target value setting means for setting a target value of the approaching/separating state evaluation index, such that the target value of the approaching/separating state evaluation index increases linearly from an initial value at a constant slope when the distance decreases, wherein:

the initial value is the approaching/separating state evaluation index at a time when a driver of the vehicle starts a drive operation to decelerate the vehicle when the vehicle proceeds into the curve or travels along the curve; and the constant slope is a slope of the approaching/separating state evaluation index at the time when the driver starts the drive operation to decelerate the vehicle;

a target vehicle deceleration calculating means for calculating a target vehicle deceleration based on a target relative speed between the vehicle and the road associated object and a present relative speed between the vehicle and the road associated object, wherein the target relative speed is obtained based on the target value of the approaching/separating state evaluation index; and a braking force control means for controlling braking force, which is applied through a brake system of the vehicle, such that a deceleration of the vehicle coincides with the target vehicle deceleration, when the vehicle proceeds into the curve or travels along the curve.

42. The vehicle control system according to claim 41, further comprising a deceleration estimating means for estimating the deceleration of the vehicle, which is generated through the drive operation by the driver to decelerate the vehicle, wherein the braking force control means does not control the braking force when the deceleration of the vehicle is larger than the target vehicle deceleration.

43. The vehicle control system according to claim 41, further comprising a collision time allowance calculating means for calculating a collision time allowance that indicates a time allowance before the vehicle collides with the road associated object, wherein the braking force control means does not control the braking force when the collision time allowance is equal to or longer than a predetermined amount of time.

44. The vehicle control system according to claim 41, wherein the target value setting means multiplies the slope of the approaching/separating state evaluation index by gain, which is determined by a driver of the vehicle, and sets the target value of the approaching/separating state evaluation index using the slope multiplied by the gain.

* * * * *